United States Patent
Hashimoto et al.

(10) Patent No.: US 7,822,004 B2
(45) Date of Patent: Oct. 26, 2010

(54) DATA TRANSMISSION LINE ESTABLISHING SYSTEM BETWEEN MOBILE TELEPHONE TERMINALS

(75) Inventors: Masanori Hashimoto, Kawasaki (JP); Yasuo Tezuka, Kawasaki (JP); Akio Yaba, Kawasaki (JP); Kayo Motohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 774 days.

(21) Appl. No.: 11/788,855

(22) Filed: Apr. 20, 2007

(65) Prior Publication Data
US 2007/0197209 A1    Aug. 23, 2007

Related U.S. Application Data

(63) Continuation of application No. PCT/JP2004/015496, filed on Oct. 20, 2004.

(51) Int. Cl.
*H04Q 7/24* (2006.01)
(52) U.S. Cl. .................. 370/338; 455/456.1; 455/561; 455/552.1
(58) Field of Classification Search .............. 370/338; 455/456.1, 561, 552.1
See application file for complete search history.

(56) References Cited

U.S. PATENT DOCUMENTS 6,940,847 B1    9/2005   Glitho et al.

| | | |
|---|---|---|
| 2002/0151316 A1 | 10/2002 | Kato |
| 2003/0224820 A1 | 12/2003 | Einola et al. |
| 2004/0005886 A1 | 1/2004 | Oda et al. |

FOREIGN PATENT DOCUMENTS

| | | |
|---|---|---|
| JP | 2002-535888 | 10/2002 |
| JP | 2004-507946 | 3/2004 |
| WO | WO 0042760 | 7/2000 |
| WO | WO 0217664 | 2/2002 |

OTHER PUBLICATIONS

PCT International Preliminary Report on Patentability (Chapter I of the Patent Cooperation Treaty), includes PCT/IB/373, PCT/ISA/237, dated: Jun. 14, 2007; International application No. PCT/JP2004/015496, Filing date: Oct. 20, 2004; 5-pages.

*Primary Examiner*—Temica M Beamer
(74) *Attorney, Agent, or Firm*—Hanify & King, P.C.

(57) ABSTRACT

In a network system including a radio base station to be accommodated in a mobile telephone network through an IP network, the radio base station, when receiving a calling request from a calling terminal, specifies a called terminal of the calling request. If the called terminal can receive the calling request by using another radio base station different from the base station connected to the IP network, it is tried to establish a data communication line, in which the radio base station and the another radio base station are connected through the IP network not by way of the mobile telephone network, so as to exchange the communication data between the calling terminal and the called terminal.

27 Claims, 23 Drawing Sheets

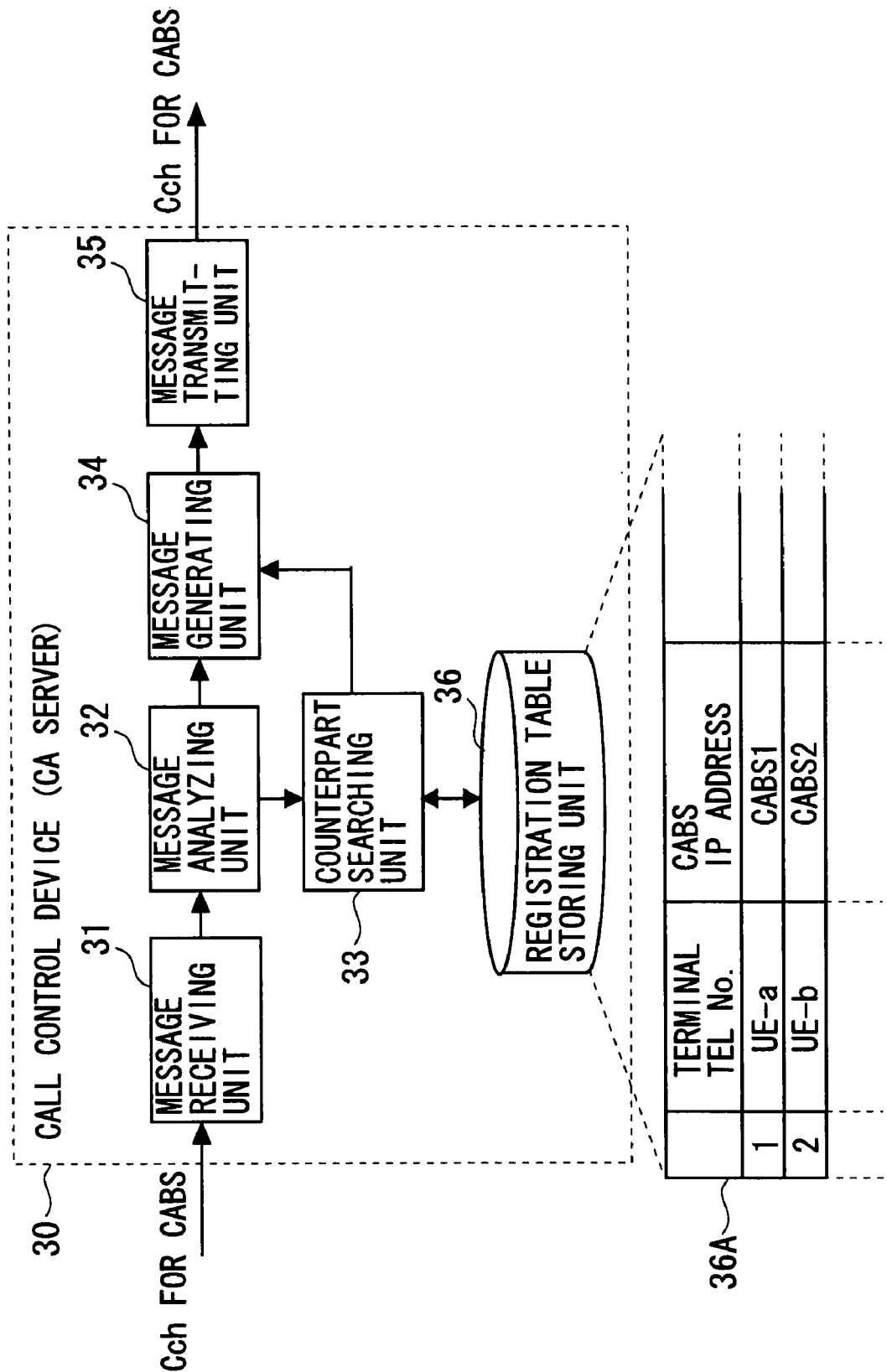

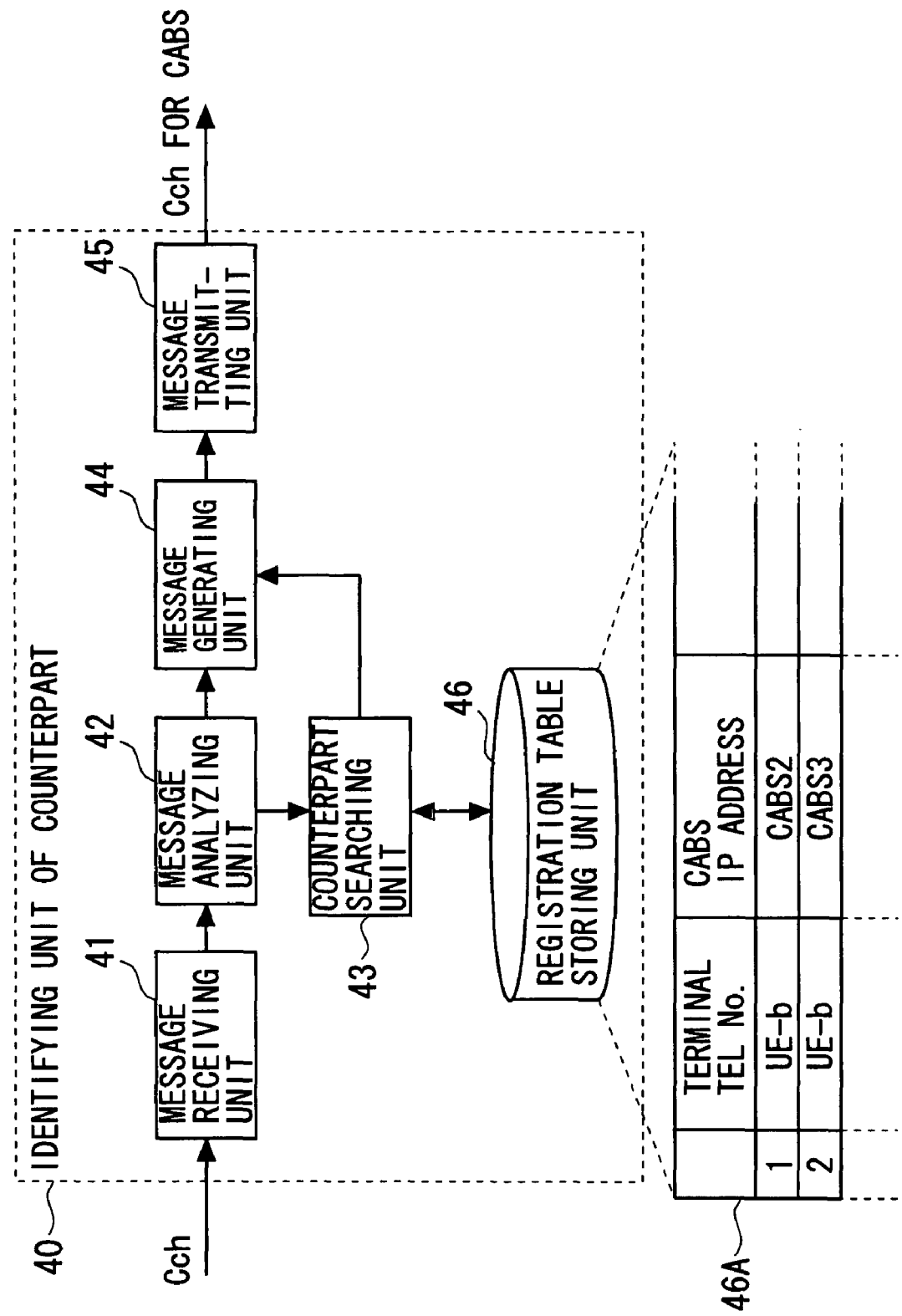

DATA TRANSMISSION LINE ESTABLISHING SYSTEM BETWEEN MOBILE TELEPHONE TERMINALS

CROSS-REFERENCE TO RELATED APPLICATION

This is a continuation of Application PCT/JP2004/015496, filed on Oct. 20, 2004, now pending, the contents of which are herein wholly incorporated by reference.

BACKGROUND OF THE INVENTION

1. Field of the Invention

The present invention relates to a communication system using a very small base transceiver station accommodated in a mobile telephone network through an IP (Internet Protocol) network.

2. Description of the Related Art

In a mobile telephone network such as a Third Generation mobile telephone network, there exists an area where radio waves are difficult to penetrate (referred to as "blind zone") even within a service area (an area in the reach of radio waves from a base transceiver station) on a map. Radio waves basically go straight, which means that radio waves from a base transceiver station may not adequately reach an area such as an area in the shadow of a building, an indoor space, or under the ground.

The blind zone includes, for example, an indoor space, in particular, inside of a personal home such as a detached home or a condominium. It is desired that radio waves from a mobile telephone network be smoothly received in the personal home by installing a very small base transceiver station in the personal home.

Prior arts related to the present invention are disclosed, for example, in Patent Documents 1 and 2 described below.
  Patent Document 1: JP 2004-507946 A
  Patent Document 2: JP 2002-535888 A

SUMMARY OF THE INVENTION

It is an object of the present invention to provide a technology for attaining an efficient use of a mobile telephone network and an IP network by using a very small base transceiver station installed in a blind area in the mobile telephone network through the IP network.

The present invention provides a system for establishing a data transmission line between mobile telephone terminals, including: a radio base transceiver station accommodated in a mobile telephone network through an IP (Internet Protocol) network; and a trial unit to try to establish a data communication line, in a case where a calling request received by the radio base transceiver station from a mobile telephone terminal as a calling terminal can be received by another mobile telephone terminal as a called terminal corresponding to the calling request by using another radio base transceiver station connected to the IP network, the another radio base transceiver station being different from the radio base transceiver station, the data communication line being established for transmitting data to be exchanged between the calling terminal and the called terminal, the data communication line connecting the radio base transceiver station and the another radio base transceiver station to each other through the IP network without routing through the mobile telephone network.

According to the present invention, a data transmission line for data communication between mobile telephone terminals is established in which radio stations are directly connected to one another, not by way of a mobile telephone network. Therefore, data (user data) does not go through the mobile telephone network, which makes it possible to reduce traffic in the mobile telephone network.

Also, in the case where a data transmission line between terminals is established through the mobile telephone network, the traffic of data goes through the IP network twice. In contrast to this, in the case where a data transmission line is established by directly connecting radio base transceiver stations to one another, the traffic of data goes through the IP network just once, which makes it possible to reduce the traffic in the IP network.

The system according to the present invention can further include a unit to establish an alternative data transmission line through the mobile telephone network and the IP network in a case where the data communication line cannot be established, the alternative data transmission line being established for transmitting data to be exchanged between the calling terminal and the called terminal.

In a case where it is not possible to establish a data transmission line by directly connecting radio base transceiver stations to one another, another data transmission line is alternatively established by way of the mobile telephone network and the IP network. Therefore, it is possible to guarantee connection between a calling terminal and a called terminal.

Further, the present invention provides a system for establishing a data transmission line between mobile telephone terminals, including: a plurality of radio base transceiver stations accommodated in a mobile telephone network through an identical IP (Internet Protocol) network; and a call agent device provided to the IP network, in which: the call agent device includes: a storage portion for storing counterpart information including identification information of a mobile telephone terminal and an IP address of a radio base transceiver station accommodated in the IP network, the radio base transceiver station being available to the mobile telephone terminal; a receiving portion for receiving a calling request issued by a mobile telephone terminal as a calling terminal, from one of the plurality of radio base transceiver stations as radio base transceiver stations on a calling side; a retrieving portion for obtaining identification information of a mobile telephone terminal as a called terminal, and for reading out, from the storage portion, an IP address of a radio base transceiver station corresponding to the identification information obtained, the identification information being included in the calling request; and a transmitting portion for transmitting the calling request, in a case where an IP address of a radio base transceiver station is read out by the retrieving portion, to the IP address by assuming that a radio station having the IP address is a radio station on a called side; and the system establishes a data communication line between the radio base transceiver station on the calling side and the radio base transceiver station on the called side through the CA terminal, in a case where the called terminal is subordinated to the radio base transceiver station on the called side itself, the data communication line being established for transmitting data to be exchanged between the calling terminal and the called terminal, the data communication line connecting the radio base transceiver station on the calling side and the radio base transceiver station on the called side to each other through the IP network without routing through the mobile telephone network.

The system can be configured so that the radio base transceiver station on the called side notifies, through the call agent device, the radio base transceiver station on the calling side of a message indicating that the called terminal does not exist under the radio base transceiver station on the called side, in a case where the radio base transceiver station on the called side cannot receive a response with respect to the calling request which has been transmitted to the called terminal, and the radio base transceiver station on the calling side establishes a first data transmission line between the radio base transceiver station on the calling side and the calling terminal, establishes a second data transmission line through the mobile telephone network in a case where the message has been received from the call agent device, the second data transmission line connecting the radio base transceiver station on the calling side and the called terminal by assuming that the radio base transceiver station on the calling side itself as a calling terminal, and establishes a data transmission line between the calling terminal and the called terminal by connecting the first data transmission line and the second data transmission line.

Further, the system can be configured so that, in a case where counterpart information corresponding to the calling request is not registered in the storage portion, the radio base transceiver station on the calling side establishes a first data transmission line between the radio base transceiver station on the calling side and the calling terminal, establishes a second data transmission line through the mobile telephone network, the second data transmission line connecting the radio base transceiver station on the calling side and the called terminal by assuming that the radio base transceiver station on the calling side itself as a calling terminal, and establishes a data transmission line between the calling terminal and the called terminal by connecting the first data transmission line and the second data transmission line.

The present invention provides a system for establishing a data transmission line between the mobile telephone terminals, including a plurality of radio base transceiver stations accommodated in a mobile telephone network through an identical IP (Internet Protocol) network, in which at least one of the plurality of radio base transceiver stations as radio base transceiver stations on the calling side includes: a storage portion for storing counterpart information including identification information of a mobile telephone terminal and an IP address of a radio base transceiver station accommodated in the IP network which is available to the mobile telephone terminal; a receiving portion for receiving a calling request issued by a mobile telephone terminal as a calling terminal; a retrieving portion for obtaining identification information of a mobile telephone terminal as a called terminal, and for retrieving, from the storage portion, an IP address of a radio base transceiver station corresponding to the identification information obtained, the identification information being included in the calling request; a transmitting portion for transmitting the calling request, in a case where an IP address of a radio base transceiver station corresponding to the identification information is retrieved, to the IP address by assuming that a radio station having the IP address is a radio station on a called side; and a control unit to establish a data transmission line by connecting the radio base transceiver station on the calling side and the radio base transceiver station on the called side to each other through the IP network without routing through the mobile telephone network with respect to the radio base transceiver station on the called side, when the called terminal exists under the radio station on the called side itself, the data transmission line being established for transmitting data to be exchanged between the calling terminal and the called terminal.

The system can be configured so that the radio base transceiver station on the called side notifies, in a case where the radio base transceiver station on the called side cannot receive a response with respect to the calling request which has been transmitted to the called terminal, the radio base transceiver station on the calling side of a message indicating that the called terminal does not exist under the radio base transceiver station on the called side, and the radio base transceiver station on the calling side establishes a first data transmission line between the radio base transceiver station on the calling side and the calling terminal, establishes in a case where the message has been received from the radio base transceiver station on the called side a second data transmission line in which the radio base transceiver station on the calling side and the called terminal are connected to each other through the mobile telephone network by assuming that the radio base transceiver station of the calling side itself as a calling terminal, and establishes a data transmission line between the calling terminal and the called terminal by connecting the first data transmission line and the second data transmission line.

Further, the system can be configured so that the radio base transceiver station on the calling side establishes a first data transmission line between the radio base transceiver station on the calling side and the calling terminal in a case where counterpart information corresponding to the calling request is not registered in the storage portion, further establishes a second data transmission line in which the radio base transceiver station on the calling side and the called terminal are connected to each other through the mobile telephone network by assuming that the radio base transceiver station on the calling side itself as a calling terminal, and establishes a data transmission line between the calling terminal and the called terminal by connecting the first data transmission line and the second data transmission line.

Further, according to the present invention, it is possible to realize the radio base transceiver station and the call agent device constituting the above-mentioned system, and a method of establishing a data transmission line which has characteristics similar to those of the above-mentioned system.

According to the present invention, it is possible to attain an efficient use of a mobile telephone network and an IP network by using a small-sized radio base transceiver station installed in a blind area in the mobile telephone network through the IP network.

BRIEF DESCRIPTION OF THE DRAWINGS

FIG. 23 is a block diagram showing an exemplary configuration of a call agent device according to the present invention.

FIG. 24 is a block diagram showing an exemplary configuration of an identifying unit of a counterpart in the very small base transceiver station according to the present invention.

DESCRIPTION OF REFERENCE NUMERALS

Figure 1:
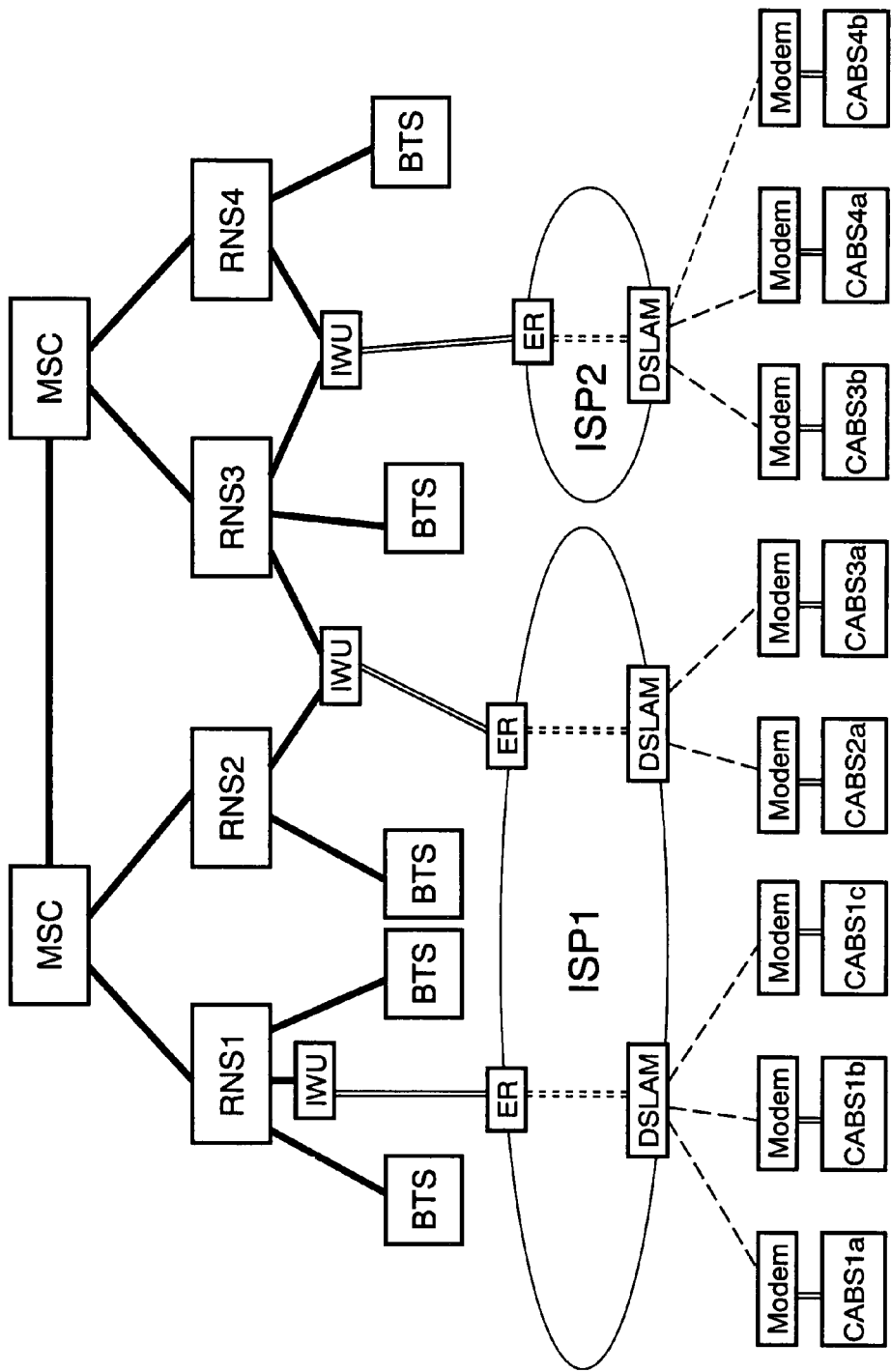
FIG. 1 is a diagram showing an exemplary configuration of a mobile telephone network to which the present invention is applicable.

10 . . . CABS (base transceiver station)
19 . . . CNA unit (control unit, protocol converting unit)
20 . . . terminal-side emulator
21 . . . network-side emulator
22 . . . first cipher processing unit
23 . . . second cipher processing unit
24 . . . bearer selector (switching unit)
25 . . . tone generating unit
30 . . . call control device
31, 41 . . . message receiving unit (receiving unit)
32, 42 . . . message analyzing unit
33, 43 . . . counterpart searching unit (searching unit)
34, 44 . . . message generating unit
35, 45 . . . message transmitting unit (transmitting unit)
36, 46 . . . registration table storing unit (storing unit)
36A, 46A . . . registration table

DETAILED DESCRIPTION OF THE PREFERRED EMBODIMENTS

Circumstances of the Invention

First, the circumstances of the present invention are described. The blind zone within a mobile telephone network service area includes a personal home (user home) such as a detached home and a condominium. It is demanded to install a very small base transceiver station in the personal home to allow a mobile telephone user to use a mobile telephone from inside the personal home. As compared with a commonly-installed base transceiver station, such a very small base transceiver station for home user is preferably configured to include the characteristics as described below.

(1) To allow in-house installation, a base transceiver station is required to be small-sized and low-priced, have a small service area (an area in the reach of radio waves from a very small base transceiver station), and provide low-power output (to make interference with respect to other similar base transceiver stations as small as possible).

(2) Installation of a physical line is required between a base transceiver station and a base transceiver station control device to form a network. In the physical line, data is sent/received by utilizing an IP packet transmission path on a broadband line service for connection to the Internet which is widely used in personal homes (e.g., xDSL (x Digital Subscriber Line) or CATV (Cable TV) Internet connecting services).

(3) An individual user will bear the expenses for installing such a very small base transceiver station for home user. From those viewpoints, an authentication function (a function for authentication between the terminal and the very small base transceiver station) is provided between a base transceiver station control device (RNS: Radio Network Sub-system) and a very small base transceiver station to authorize only the user (and related people) having installed the very small base transceiver station to make a connection to the very small base transceiver station.

FIG. 1 is a diagram showing an example configuration of connections between a mobile telephone network and very small base transceiver stations. In FIG. 1, MSCs (Mobile services Switching Centers) are switching devices (switches) of the mobile telephone network. The MSCs are connected to each other and each accommodates at least one RNS. The RNSs are base transceiver station control devices for controlling their subordinate base transceiver stations. Each RNS accommodates at least one BTS (Base Transceiver station). The BTSs are base transceiver stations that perform radio communication with terminals (mobile stations or user equipment (UE)). The mobile telephone network includes those elements.

FIG. 1 shows part of a 3G (IMT-2000) UMTS (Universal Mobile Telecommunication System) as an example of a mobile telephone network. In general, the UMTS is formed of a core network and an access network (UTRAN (Universal Terrestrial Radio Access Network)) to the core network. The UTRAN includes radio sections. The MSCs of FIG. 1 are components included in the core network and the RNSs and BTSs are components included in the UTRAN.

CABSs (Cubicle Area BTSs) of FIG. 1 correspond to the very small BTS for home user. The CABSs are installed with in general personal homes and connected to RNSs of the mobile telephone network through an ISP (Internet Service Provider) network.

The example of FIG. 1 assumes that an Internet connection broadband line (e.g., xDSL) is installed in each user home by an ISP. Each CABS is connected to an IP interface of an xDSL modem accommodating a fixed telephone line used as the broadband line. Each xDSL modem is connected to a DSLAM (Digital Subscriber Line Access Multiplexer) provided on the ISP network through an xDSL line distributed from the fixed telephone line.

Each RNS is connected, via an IWU (Inter-Working Unit) to an edge router (ER) provided at the entrance of the ISP network. The mobile telephone network and the ISP network are thus connected to each other.

The IWU is a conversion device between the IP layer and the ATM (Asynchronous Transfer Mode) which is a lower layer of the existing mobile telephone network. The RNS and the ER are connected through channels of a number corresponding to the amount of calls from the mobile telephone network.

Thus, the CABSs are physically connected through fixed telephone lines. Also, the CABSs are connected to the RNSs through the IP interfaces. Thus, all of the CABSs connected to a certain ISP network can be accommodated in the mobile telephone network.

In this way, when the CABSs are connected to the mobile telephone network using broadband lines (environments for connection to ISP) that are already installed in the homes, there is no need to install each home having CABSs already installed therein with a special line for connection to the mobile telephone network (RNS). This reduces costs for the introduction of CABSs.

Also, the CABSs have a function of permitting only particular terminals to be connected to the CABSs themselves. Specifically, when a CABS receives a connection request from a terminal, the RNS/MSC performs an authentication process for the CABS. When the result of the authentication indicates that the connection-requesting terminal is a connection-permitted terminal, the CABS then authorizes the connection request from the terminal.

Figure 2:
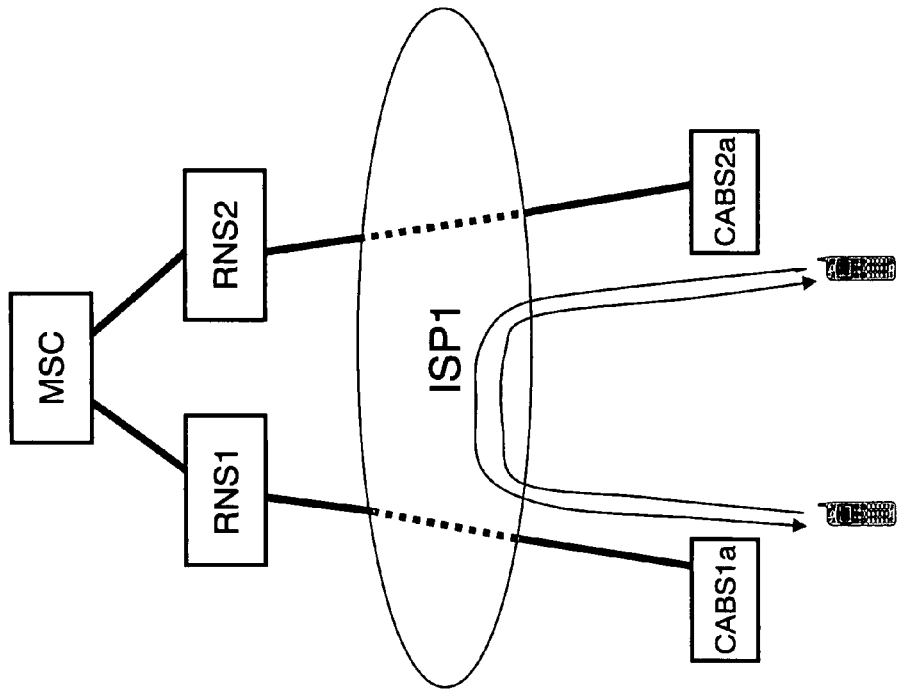
FIG. 2 is a view showing a currently-available bearer route through which voice data passes.

FIG. 2 shows a case where terminals communicate with each other under a CABS which is accommodated in the same ISP, based on a system in which CABSs are accommodated as shown in FIG. 1.

As can be clearly seen from FIG. 2, the data exchanged between the terminals (e.g., voice data in a case of a voice call) passes through the route of CABS1a-RNS1-MSC-RNS2-CABS2a (shown as arrows in FIG. 2). At this time, the same ISP network (IP network) is passed through twice.

Figure 3:
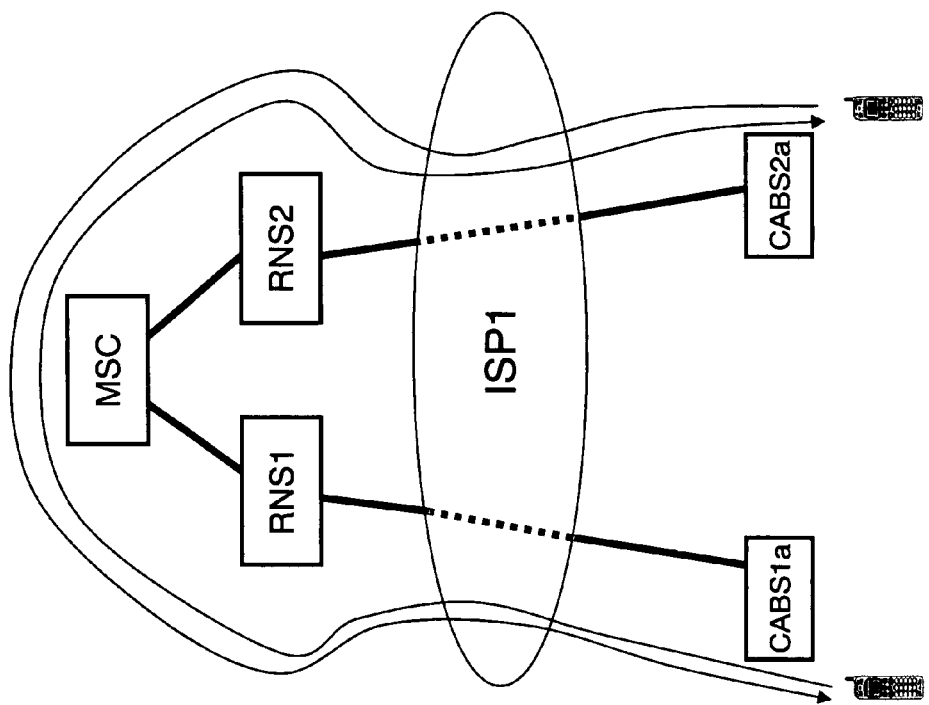
FIG. 3 is a view showing a bearer route according to the present invention through which voice data passes.

As shown in FIG. 3, in the case of the communication using the route as shown in FIG. 2, if the data can be sent/received between the terminals through a direct connection between the CABSs, the traffic through the ISP network is halved. This is clearly advantageous also in an aspect of facilities because the traffic between the CABSs does not pass through the mobile telephone network located above the ISP network.

Each CABS has an IP address uniquely allocated in the ISP. If each CABS knows IP addresses of other CABSs, they can exchange IP packets (e.g., IP packets containing voice data) directly (without passing through the mobile telephone network).

This form of communication is similar to the communication performed by an IP telephone. This IP telephone service is provided by many ISPs today. In order to provide the IP telephone service, an ISP installs a CA (Call Agent) server in an ISP network so that the CA server exchanges CA signals with the IP telephone terminals, to thereby provide communication service. Accordingly, it may be possible to provide service in the same way as described above by using a set of a mobile telephone terminal and a CABS as an IP telephone terminal.

However, there are critical problems in reality in implementing the service by directly connecting the CABSs to one another through the ISP network as described above.

First of all, the mobile telephone terminal and the CABS are conforming to a protocol (3GPP standard) for a mobile telephone, which is different from an IP telephone protocol (such as an SIP (Session Initiation Protocol)) usually provided by the ISP. For this reason, under the present situation, the CABS and the CA server cannot exchange CA signals therebetween. Further, the mobile telephone terminal is not always in the communication area.

Further, in response to the calling request from a certain set of a mobile telephone terminal and a CABS, the CA server of the ISP issues a call request to the set of a CABS and a mobile telephone terminal which is supposed to be registered as a destination of the calling request. In this case, the call request can reach the counterpart CABS. However, there is no guarantee that the mobile telephone terminal, which is the real destination of the calling request, exists within a communication area (an area within the reach of the call request (radio waves) from the CABS) of the CABS which has received the call request.

When the mobile telephone terminal of destination does not exist in the communication area of the CABS, the mobile telephone terminal may exist under a certain BTS located somewhere in the mobile telephone network. In this case, it is desired that the call request reach the mobile telephone terminal of destination through the BTS.

However, the CA server has no way of finding that the mobile telephone terminal of destination is located under a certain BTS. In addition, the CA server cannot connect the call request to the certain BTS.

The present invention has been made in view of the above-mentioned problems. It is an object of the present invention to provide a technique capable of reducing load imposed on a mobile telephone network and on an IP network in which terminals communicate with one another through a very small base transceiver station accommodated in the same IP network.

SUMMARY OF THE INVENTION

The present invention relates to a method of establishing a data transmission line between mobile telephone terminals and to a system thereof. According to the present invention, in a case where a plurality of very small base transceiver stations (CABSs) are connected to the same ISP network (an IP network having the same addressing architecture), when a calling request from a mobile telephone terminal serving as a calling terminal is received by one of the plurality of CABSs, in order to transmit data from the calling terminal to a called terminal as a destination of the calling request, the CABSs are directly connected to one another not by way of the mobile communication network, to thereby intend to establish a substantive data transmission line between the CABS on the calling side which has received the calling request and a CABS on the called side which subordinates the called terminal.

In a case where it is not possible to establish the above-mentioned substantive data transmission line, another data transmission line is established between the calling terminal and the called terminal through the mobile telephone network and the IP network.

The present invention can be realized by using a call agent device provided in the ISP network (a first mode). The present invention can also be realized without using the call agent device (a second mode).

In the case of realizing the present invention by using the call agent device (the first mode), the call agent device is provided to the ISP network and is configured to exchange messages between a CABS on a calling side and a CABS on a called side, to thereby control a direct connection between the CABSs by the call agent device.

As the call agent device, a dedicated call agent device may be provided to the ISP network so as to control call connections (the establishment of a data transmission line) between the CABSs. However, in view of suppressing costs in system construction, it is preferable to use a call control server (referred to as "CA (call agent) server") for an IP telephone, which has been conventionally provided to the ISP network as the call agent device.

The call agent server has a function of recognizing a predetermined protocol for an IP telephone such as an SIP. However, the call agent server does not have a function of recognizing a protocol for a mobile telephone. For this reason, a protocol converting function (a protocol converting portion) for converting between the mobile telephone protocol and the IP telephone protocol is provided to each CABS which serves as either one of a CABS on the calling side and a CABS of destination.

A CABS uses the protocol converting function to transform a message (such as a calling request), which is sent from a mobile terminal based on the mobile telephone protocol, into a form based on the IP telephone protocol that can be recognized by the call agent server, or to transform a message received from the call agent server into a form based on the mobile telephone protocol that can be recognized by a mobile terminal.

Also, when the call agent device (call agent server) is employed, the call agent device determines whether the destination terminal of the calling request is a mobile telephone terminal capable of using a CABS connected to the same ISP network to which a CABS on the calling side is also connected.

In order to make this determination, the call agent device needs to have a storage device (a storage portion) which registers therein, for example, counterpart information including IP addresses of CABSs connected to the same network to which the CABS on the calling side is connected and identification information of mobile terminals (for example, telephone numbers of mobile terminals) which are capable of using the CABS.

Further, it is necessary to provide the call agent device with two functions, that is, a function of (a determining portion for) determining, upon receiving a calling request from a CABS on the calling side, whether counterpart information corresponding to a transmission source IP address of the calling request (an IP address of the CABS on the calling side) and identification information of a called terminal included in the calling request is stored in the storage portion, and a function of (a determination portion for) deciding that, when the corresponding counterpart information has been stored, an IP address of CABS included in the counterpart information as the destination of the calling request.

When a call agent server for an IP telephone is employed as the call agent device, it is preferable to make improvements as follows to the CA server, in order to provide the CA server with the above-mentioned storage portion and determining function (determining portion).

The call agent server has a registration table which registers an entry list including IP addresses of IP telephone terminals and telephone numbers of the IP telephone terminals and an identifying function (an identifying portion) for identifying, upon receiving a calling request from an IP telephone terminal, an IP address of a destination IP telephone terminal of the calling request by reading out from the registration table an entry corresponding to the calling request, to thereby provide service of connecting between the IP telephone terminals.

In reality, the entries of the registration table each further register, in addition to IP addresses and telephone numbers of the IP telephone terminals, port numbers and a voice cipher system, respectively, for establishing an RTP/UDP (Real-time Transport Protocol/User Datagram Protocol) session, as control information for establishing a voice call.

An entry including the above-mentioned counterpart information (an IP address of a CABS and identification information of a mobile terminal that can be subordinated to the CABS) is registered in the registration table, so that the call agent server can recognize each set of a CABS and a mobile terminal as an IP telephone terminal. Then, the call agent server uses the above-mentioned identifying function to identify a set of a CABS and a mobile terminal of destination. Also, it may also be possible to provide an entry of the registration table with an identification flag for indicating that a terminal is a mobile terminal.

Further, it is necessary to provide a mechanism (a configuration) in which the call agent server determines (recognizes), when a terminal to which the call agent server wishes to connect (a called terminal) does not exist under any of the CABSs registered in the call agent server, that the terminal does not exist.

It is further necessary to provide a mechanism (a configuration) in which the call agent server performs a calling process with respect to the mobile telephone network when it is determined that the called terminal does not exist under any of the registered CABSs.

In the case of realizing the present invention without using the call agent device (the second mode), it is necessary to provide a configuration for determining, upon a CABS receiving, as a CABS on the calling side, a calling request from a calling terminal, whether or not a called terminal corresponding to the calling request is capable of using a CABS connected to the same ISP network to which the CABS on the calling side is connected.

In view of this, the CABS is provided with a storage portion which registers the above-mentioned counterpart information. The CABS is further provided with a judging portion for judging, upon reception of a calling request from a calling terminal, whether or not counterpart information corresponding to the calling request is registered in the storage portion, and a determination portion for determining the destination of the calling request based on the result of judgement made in the judging portion.

MODES OF THE INVENTION

Hereinafter, modes of the present invention are described with reference to the accompanying drawings. The configurations described below are merely examples, and the present invention is not limited to those configurations.

First Mode

As a first mode of the present invention, a method of establishing a data transmission line between very small base transceiver stations through a call agent server for an IP telephone existing in an ISP network, not by way of a mobile telephone network.

First Case

Figure 4:
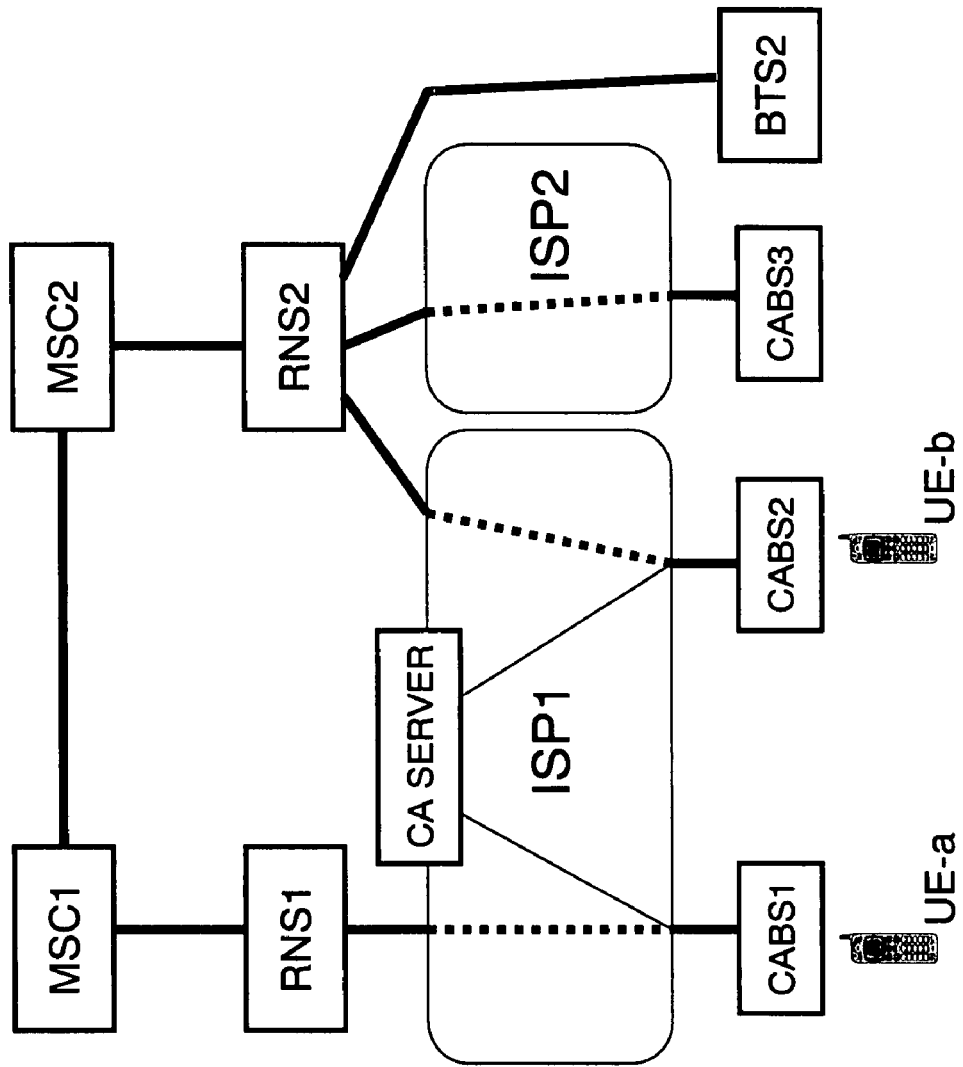
FIG. 4 is a view showing an exemplary network configuration for illustrating a first mode of the present invention, and showing a case (first case) where terminals can be connected directly through a CABS.
Figure 5:
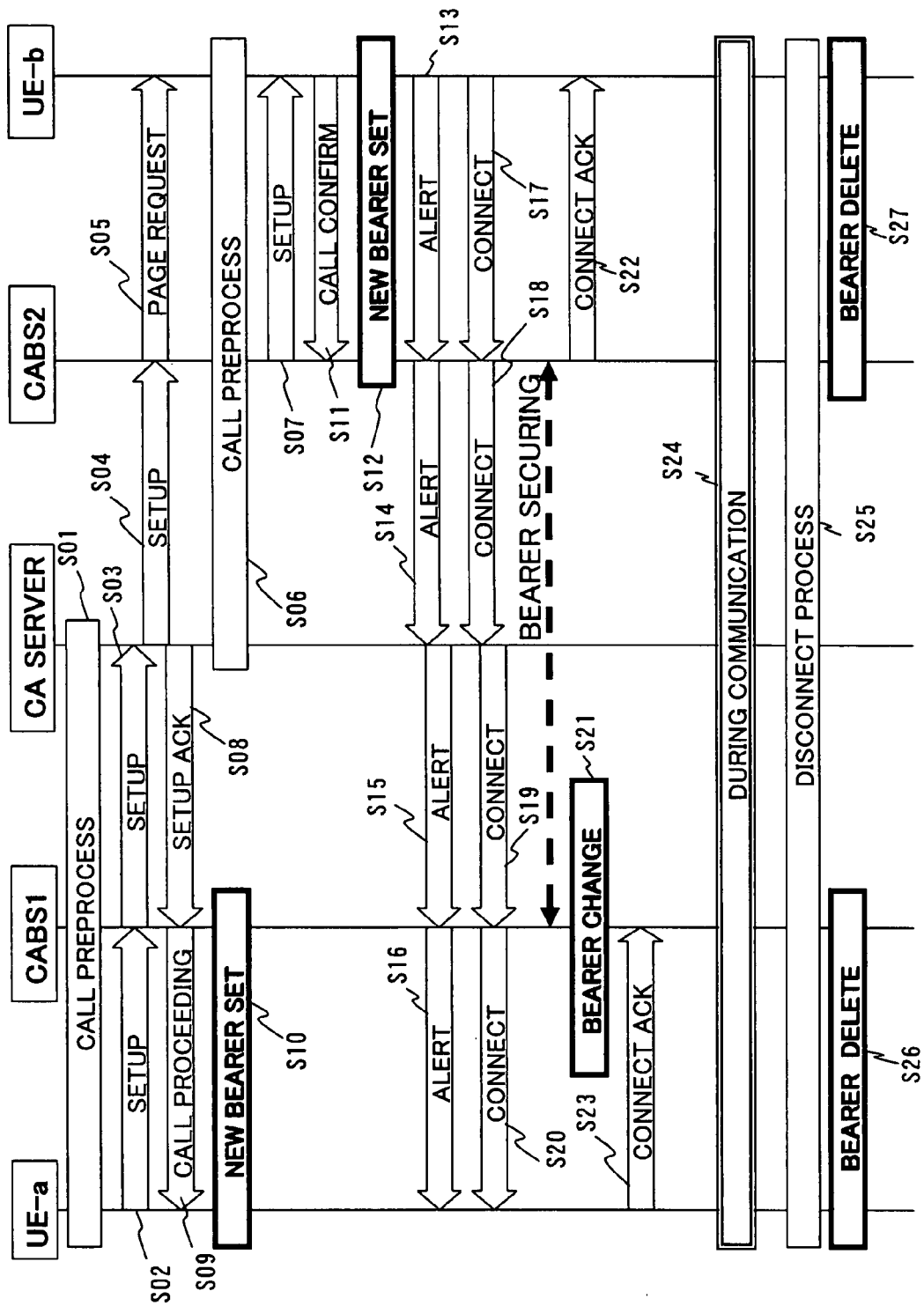
FIG. 5 is a sequence diagram illustrating the first mode of the present invention, which corresponds to FIG. 4.

FIG. 4 is a diagram for explaining a sequence performed in a case, as a first case, where a call agent server (CA server) as a call agent device exists in an ISP network (hereinafter, simply referred to as "ISP"), and a mobile terminal (hereinafter, simply referred to as "terminal") UE-a as a calling terminal and a terminal UE-b as a called terminal each are capable of communicating with a CABS1 and a CABS2, respectively, the CABS1 and the CABS2 each being connected to the ISP 1. FIG. 5 is a sequence diagram in a state of FIG. 4, that is, a case where the terminal UE-b is capable of communicating with the CABS2 connected to the ISP 1.

As shown in FIGS. 4 and 5, when the terminal UE-a originates a call, call preprocesses are performed between the terminal UE-a and the call agent server through the CABS1 (S01).

In this case, the CABS1 terminates the protocol and performs the call preprocesses in place of the RNS 1/MSC 1 which is supposed to perform the preprocesses. Those preprocesses specifically include network authentication and determination of a cipher key.

The network authentication in the preprocesses means to determine whether the terminal UE-a can perform communication in the ISP 1. It is determined by confirming that the terminal UE-a is registered in the CA server as a terminal allowed to perform communication. In view of this, the CABS1 needs to have a function of converting the protocol for exchanging authentication requests between the terminal into a call agent protocol (an IP telephone protocol) owned by the CA server.

As described above, a first feature of the present invention resides in that the CABS1 has a function of terminating the protocol for the superordinate device (RNS/MSC) on the mobile telephone network side. A second feature of the present invention resides in that the CABS has a function of converting between the terminal protocol and the CA server protocol. It is also possible to configure the present invention such that the preprocesses are only performed between the UE-a and the CABS1 (without using the CA server).

When the preprocesses are completed, a SETUP signal as a calling request (a call connection request) is sent from the terminal UE-a to the CABS1 (S02). The CABS1 converts this SETUP signal, by using the protocol converting function, into a signal corresponding to a call that can be processed by the CA server (illustrated as a SETUP message in FIG. 5), and sends the signal obtained through the conversion (S03). This is a third feature of the present invention.

The SETUP message from the CABS1 includes an IP address of the CABS1, a telephone number of the terminal UE-a (identification information of the calling terminal), and a telephone number of the called terminal (identification information of the called terminal). The CA server operates, upon receiving the SETUP message from the CABS1, based on the recognition that the CABS1 is an IP telephone terminal.

The SETUP message includes a telephone number of the terminal UE-b as a called terminal. The CA server identifies the destination CABS2 by crosschecking an identification number of the terminal with the registered information (information registered in the above-mentioned registration table). In other words, the CA server reads out, from the registration table, an IP address of the CABS2 as an IP address of the CABS corresponding to the terminal UE-b, to thereby identify the destination CABS. The CA server sends a calling message (SETUP) to the CABS2 (S04). This operation is similar to the operation in the case where the CABS2 is regarded as an IP telephone terminal.

The CABS2, upon receiving the calling message (SETUP), first checks whether the CABS2 subordinates the terminal UE-b (which is specified by the identification number included in the calling message).

In order to check whether the CABS2 subordinates the terminal UE-b, the CABS2 sends a call request to the terminal UE-b by sending a call request message "PAGE REQUEST" (S05). At this time, the CABS2 performs protocol conversion to convert the calling message into "PAGE REQUEST" that can be recognized by the terminal UE-b, by using the protocol conversion function provided to the CABS2 itself. This protocol conversion is also regarded as the third feature of the present invention.

When the terminal UE-b exists in (within the reach of) the communication area of the CABS2, the terminal UE-b sends the response with respect to the call request "PAGE REQUEST" back to the CABS2. When the CABS2 receives the response, the call preprocesses corresponding to the same call on the terminal UE-a are activated (S06) and network authentication for the terminal UE-b is performed.

When the terminal UE-b is authenticated without any problem, the CABS2 sends a SETUP signal as a call connection request to the terminal UE-b (S07). When the terminal UE-b responds to the SETUP signal, the process proceeds to the next step.

Meanwhile, the CA server receives the SETUP signal (a calling message: S03) from the CABS1. When the destination (CABS2) is identified based on the calling message, the CA server sends a response message "SETUP ACK" which includes an IP address of the destination (the IP address of the CABS2) to the CABS1 (S08).

Upon receiving the response message, the CABS1 sends a message "CALL PROCEEDING" to the terminal UE-a and establishes a radio communication channel bearer (through which voice data is exchanged: sometimes referred to as "radio bearer") between the CABS1 and the terminal UE-a (S09: NEW BEARER SET).

In the meantime, on the CABS2 side, when the CABS2 receives a "CALL CONFIRM" message from the terminal UE-b (S11) in response to the SETUP signal (S07), the CABS2 establishes the radio communication channel bearer with respect to the terminal UE-b (S12).

At this time, the terminal UE-b makes calling sound to page the user of the terminal UE-b. At the same time, upon the establishment of the bearer, the terminal UE-b sends a message "ALERT" indicating that the terminal UE-b is being called, to the CABS2 (S13).

This "ALERT" is conveyed to the terminal UE-a through the CABS2, CA server, and the CABS1 (S14, S15, S16). The terminal UE-a can recognize, based on the "ALERT" thus received, that the terminal UE-b is being called.

At this time, it is necessary to generate an RBT (Ring Back Tone) to be heard by the terminal UE-a. For this reason, the CABS1 has a tone generation function. This is a fourth feature of the present invention.

When the user of the terminal UE-b picks up the telephone in response to the calling sound to answer the call, the terminal UE-b sends a CONNECT message indicating that the called terminal has responded (S017).

The CONNECT message is sent to the CABS1 through the CABS2 and the CA server (S18, S19). Then, the CONNECT message is given to the terminal UE-a by the CABS1 (S20).

When the CONNECT message is conveyed to the terminal UE-a, a VoIP (Voice over IP) session (a substantive data transmission line) is established between the CABS1 and the CABS2, allowing the communication to be started. After that, voice data from a terminal is made into a packet form and exchanged between the CABS1 and the CABS2.

The CABS1 and the CABS2 do not have a concept of establishing bearer therebetween (because the CABS1 and the CABS2 are connected together through an IP network). The CABS1 and the CABS2 exchange CA signals as described above to set an IP address of the counterpart CABS as a destination IP address of a packet, to thereby transmit and receive voice data (that is, it is regarded that the bearer is secured (Bearer Securing))

Meantime, at the same time when the CONNECT message (S20) reaches the terminal UE-a to start communication, the CABS1 internally switches a voice route path which has been established between the tone generation portion and the terminal UE-a in the CABS1 to a voice route path for voice data communication with respect to the CABS2 (S21). This is a fifth feature of the present invention.

Each of the CABS2 and the terminal UE-a, upon receiving the CONNECT message, sends back a response message "CONNECT ACK", with respect to the CONNECT message, to the terminal UE-b and the CABS1, respectively (S22, S23). After that, the communication is established between the terminal UE-a and the terminal UE-b (during communication) (S24).

In order to disconnect the communication, the following procedure is performed. That is, in response to a disconnection instruction from the terminal UE, disconnection signals are exchanged between the CABS1, the CA server, the CABS2, and the terminal UE-b (DISCONNECT PROCESS) (S25).

After that, a process of releasing the radio bearer between the terminal UE-a and the CABS1 is performed (S26). Further, a process of releasing the radio bearer between the terminal UE-b and the CABS2 is also performed (S27). This disconnect process of communication can be realized by an operation similar to the operation performed on the network side when the mobile telephone terminal is disconnecting the line.

As described above, in the first case, according to the network system shown in FIG. 5, in the case where the CABS1 as a radio base transceiver station and a called terminal (the terminal UE-b) corresponding to a calling request (SETUP) received by the CABS1 from the terminal UE-a as a calling terminal are capable of receiving the calling request by using another radio base transceiver station (CABS2) different from the CABS1 but connected to the same IP network to which the CABS1 is also connected, the system functions as a system for establishing data transmission line between mobile telephone terminals, the system being provided with a trial to try to establish a data transmission line between the CABS1 and the CABS2 through the ISP 1. In a third case, the CA server realizes the function of the trial unit.

Second Case

Figure 6:
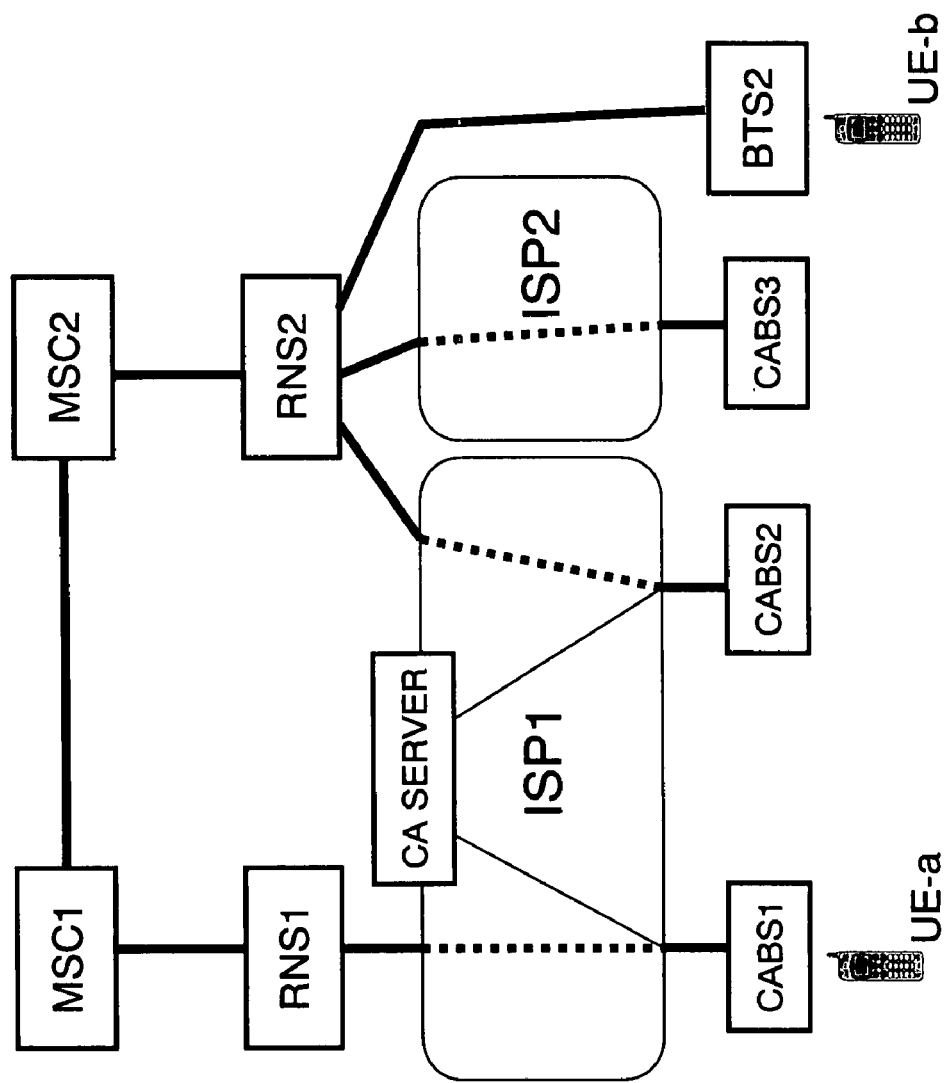
FIG. 6 is a view showing an exemplary network configuration for illustrating the first mode of the present invention, and showing a case (second case) where terminals cannot be connected directly through a CABS.
Figure 7:
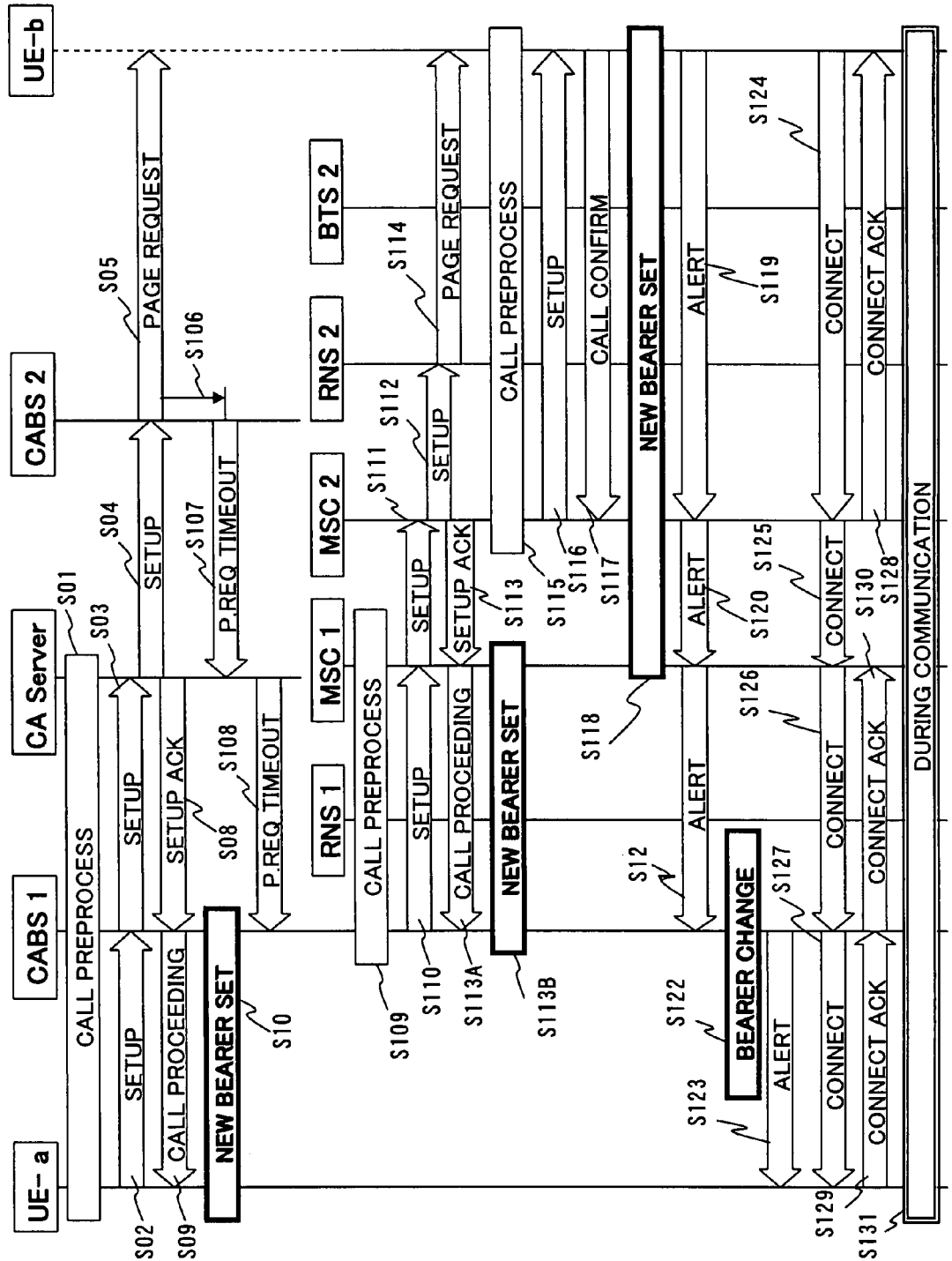
FIG. 7 is a sequence diagram illustrating the first mode of the present invention, which corresponds to FIG. 6.

FIG. 6 shows how the calling operation changes in a case where the called terminal UE-b of FIG. 4 exists under a general BTS (BTS 2 of FIG. 6) as a second case. FIG. 7 is a sequence diagram of the second case.

In FIG. 7, a calling procedure from the terminal UE-a is similar to that of the first case, and a SETUP signal from the CA server reaches the CABS2 (S01 to S04). Also, as in the first case, when the "SETUP ACK" is sent from the CA server, the radio communication channel bearer is established between the CABS1 and the terminal UE-a (S08 to S10).

Upon receiving the "SETUP", the CABS2 transmits a call request "PAGE REQUEST" to the terminal UE-b as in the first case (S05). However, the terminal UE-b does not exist under the CABS2 (within the communication area of the CABS2), and there is no reply from the terminal UE-b accordingly.

On the other hand, upon sending the call request, the CABS2 monitors by a timer whether there is any response to the call request (S106). The CABS2 determines that the terminal UE-b does not exist under the CABS2 upon timing out of the timer, and sends a time-out message to the CA server so as to notify the CA server of the timeout (S107; P. REQ Timeout).

Upon receiving the time-out message, the CA server determines that it is not possible to directly connect the CABSs to one another within the ISP to which the CA server belongs. In this case, the CA server sends a message for urging the CABS1 to originate another call (an another-calling request message illustrated as a "P. REQ Timeout" message in FIG. 7) (S108).

Upon receiving the another-calling request message, the CABS1 originates another call (another-calling) with respect to the mobile telephone network side. This is a sixth feature of the present invention.

The succeeding procedure follows the same sequence as the sequence to originate and receive a call in the existing mobile telephone network. However, the present invention is different from the conventional case in that the CABS1 retries from the call preprocesses in place of the terminal UE-a. The reason why the CABS1 performs the retry is that the terminal UE-a cannot repeat the same processes which have already been performed.

For this reason, the CABS1 operates as a calling terminal with respect to the mobile telephone network, and establishes a bearer for data communication between the CABS1 and the terminal UE-b. Then, the CABS1 connects the established bearer to the radio communication channel bearer between the CABS1 and the terminal UE-a. In this manner, with respect to the terminal UE-a, the CABS1 sets up a call as if the communication call has been established by the calling request sent by the terminal UE-a itself.

In this case, a cipher key agreed on between the CABS1 and the RNS 1/MSC 1 is different from the cipher key agreed on between the terminal UE-a and the CABS1 in the call preprocesses (S01). Therefore, the CABS1 subjects all the control messages and communication data which go through the CABS1 to the decipher/re-cipher process. This is a seventh feature of the present invention.

The decipher and re-cipher process as described above is performed not only in the call calling/receiving process but also in the call disconnection process. Therefore, the sequence process equal to the existing case can be performed.

With reference to FIG. 7, description is made of the processes performed in and after S108 (the call calling/receiving sequence performed by the CABS1). In FIG. 7, a case is assumed where the terminal UE-b exists within the communication area of the BTS 2 subordinated to the MSC 2/RNS 2.

When a call is originated by the CABS1, the call preprocess is performed between the CABS1 and the RNS 1/MSC 1 (S109).

After that, a SETUP signal as a calling request is given to the MSC 1 by the CABS1 through the RNS1 (S111). The MSC 1 judges whether the terminal UE-b exists or not within a management area of the MSC 1 itself. This judgment is made by, for example, checking whether the terminal UE-b is registered in a terminal-location management register (not shown) called a VLR (Visitor Location Register) which registers identification information of the terminals existing within the management area of the MSC 1.

When the terminal UE-b does not exist in the management area of the MSC 1, the MSC 1 identifies the location of the terminal UE-b based on an HLR (Home Location Register: a location management register which registers identification information and location information of all the terminals registered in the mobile telephone network: not shown). In this case, the terminal UE-b is located within the management area of the MSC 2, so the MSC 1 sends the SETUP signal to the MSC 2 (S111).

The MSC 2 sends the SETUP signal to the RNS which belongs to the management area of the MSC 2 (S112). Also, the MSC 2 sends back a confirmation message "SETUP ACK" to the MSC 1 (S113). When the MSC 1 receives the "SETUP ACK", the MSC 1 sends a "CALL PROCEEDING" to the CABS1 (S113A). Upon the CABS1 receiving the "CALL PROCEEDING", a bearer is established for data transmission between the CABS1 and the MSC 1 through the RNS 1 (S113B).

The SETUP signal sent from the MSC 2 in S112 reaches the RNS 2 which is subordinated to the MSC 2. The RNS 2 transmits a "PAGE REQUEST" as a call request to all the base transceiver stations subordinated to the RNS 2. In this manner, the "PAGE REQUEST" reaches the terminal UE-b through the BTS 2 (S114).

Upon the UE-b receiving the "PAGE REQUEST", the call preprocess is performed between the UE-b and the RNS 2/MSC 2 through the BTS 2 (S115).

After that, the MSC 2 sends a SETUP signal as a calling request to the terminal UE-b (S116). Then, the terminal UE-b transmits a confirmation message "CALL CONFIRM" to the MSC 2 (S117). Following this, a bearer is established for data (in this case, voice data) transmission between the terminal UE-b and the MSC 1 (S118).

After that, the terminal UE-b transmits a message "ALERT" (S119, S120, S121). Upon receiving the "ALERT" from the terminal UE-b, the CABS1 connects the "ALERT" to the bearer established between the CABS1 and the terminal UE-a (performs switching of the bearer: S122).

Then, the CABS1 deciphers and re-ciphers the "ALERT" from the MSC 1, and transmits the "ALERT" to the terminal UE-a as an "ALERT" with respect to the "SETUP" sent by the terminal UE-a (S123).

After that, when a user of the terminal UE-b responds to the calling, a message "CONNECT" is transmitted by the terminal UE-b (S124, S125, S126, S127). Note that, in S127, the CABS1 deciphers and re-ciphers the "CONNECT" sent from the MSC 1 and sends the "CONNECT" to the terminal UE-a.

Then, the MSC 2 transmits the "CONNECT ACK" with respect to the "CONNECT" to the terminal UE-b (S128), and the terminal UE-a transmits the "CONNECT ACK" with respect to the "CONNECT" to the MSC1 (S129, S130). Also, in S130, the CABS1 deciphers andre-ciphers the "CONNECT ACK" sent from the terminal UE-a, and sends the "CONNECT ACK" to the MSC 1. Following this, the communication between the terminal UE-a and the terminal UE-b is set as "During Communication" (S131).

In the above-mentioned second case, the data transmission line established between the terminal UE-a and the CABS1 corresponds to the first data transmission line, and the data transmission line established between the CABS1 and the terminal UE-b corresponds to the second data transmission line.

As described above, the network system shown in FIG. 5 functions as a system for establishing a data transmission line between mobile telephone terminals, which includes a unit (establishing unit) to establish an alternative data transmission line through the mobile telephone network and the IP network in a case where it is impossible to establish the data transmission line between the CABS1 and the CABS2 in the second case. The establishing unit is implemented by the CABS1.

Second Mode

Next, a description is given, as a second mode of the present invention, of a system in which the CABSs are directly connected to one another through the ISP network without using the CA server described in the first mode.

In a case where the CA server does not exist in the ISP network or in a case where the CA server is not used, the CABS is configured to include counterpart information therein, thereby making communication possible.

Third Case

Figure 8:
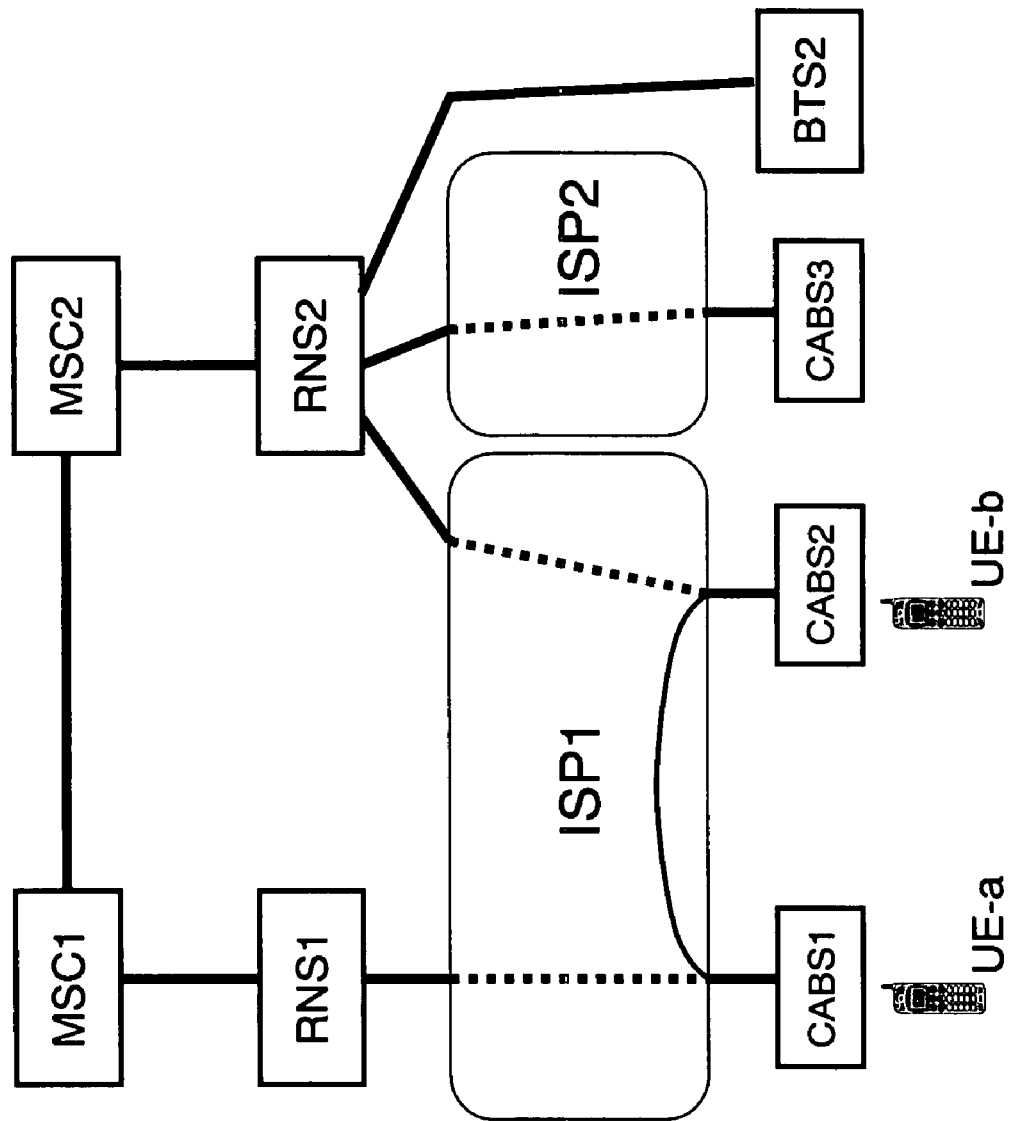
FIG. 8 is a view showing an exemplary network configuration for illustrating a second mode of the present invention, and showing a case (third case) where terminals can be connected directly through a CABS.
Figure 9:
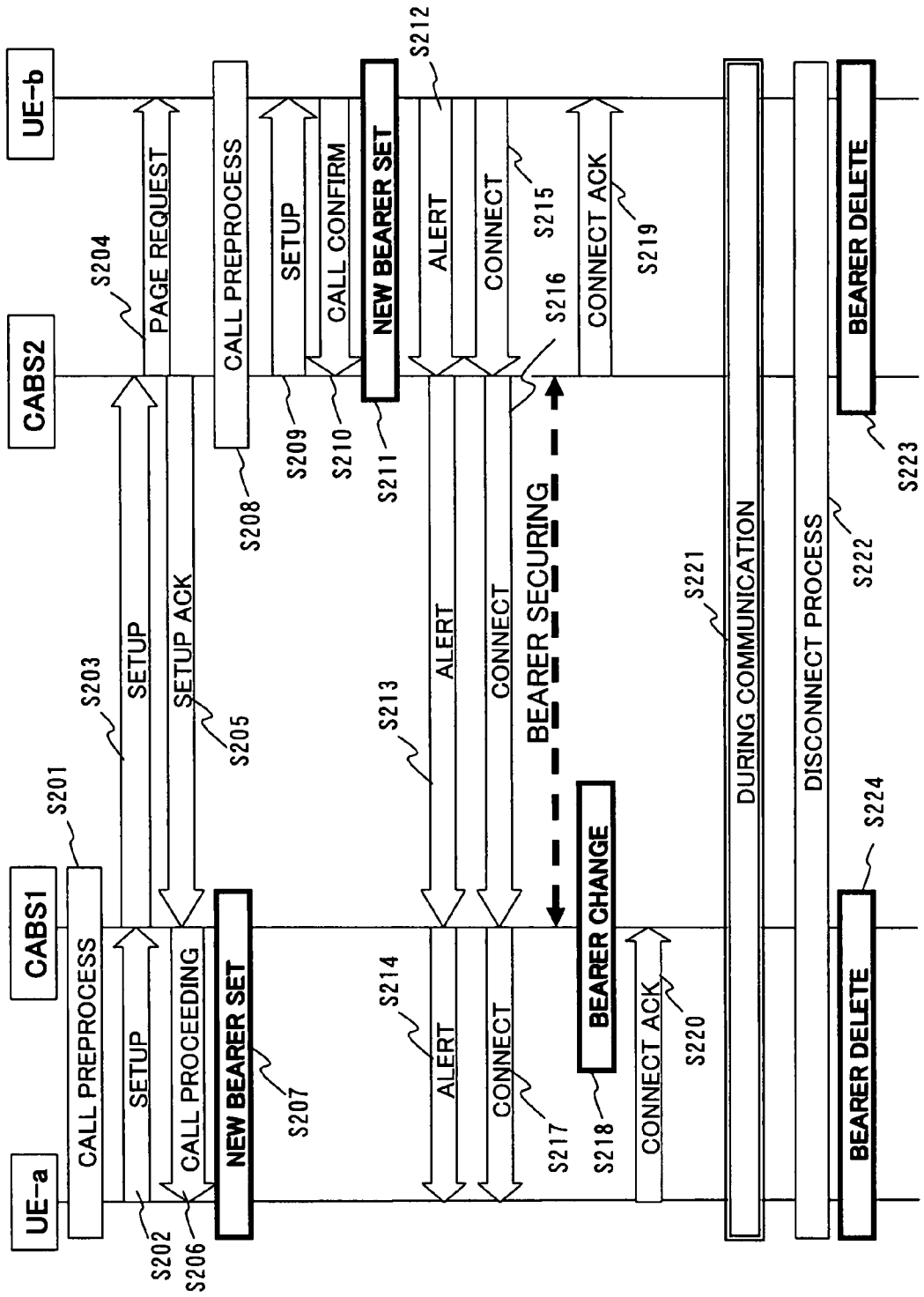
FIG. 9 is a sequence diagram illustrating the second mode of the present invention, which corresponds to FIG. 8.

FIG. 8 shows, as the second mode, a mode (a third case) in which the CABSs are directly connected to one another through the ISP network without using the CA server. FIG. 9 is a sequence diagram showing a call connection (signaling) in the second mode. The third case corresponds to the first case of the first mode.

In the second mode, the CA server is not used. Therefore, as shown in FIG. 9, the sequence of the second mode is different from the sequence of the first case of the first mode shown in FIG. 5 in that messages are directly exchanged between the CABS1 and the CABS2.

In order to directly exchange messages between the CABSs, each of the CABS1 and CABS2 is registered with at least terminal identification information including IP address of a counterpart and telephone number of a terminal capable of being connected to the CABS itself.

Accordingly, as shown in FIG. 8, for example, in a case where the terminal UE-a originates a call by using the CABS1, the CABS1 checks the counterpart information. In this manner, it is possible to judge whether a call can be made to the terminal UE-b through the CABS2. Based on the result of the judgment, the CABS1 can directly send a calling request to the terminal UE-b through the CABS2.

The sequence (S201 to S224) shown in FIG. 9 is different from that of the first mode of FIG. 5 in the following point. After performing the call preprocess (S201) upon reception of the calling request, the CABS1 checks the above-mentioned counterpart information upon reception of the SETUP signal from the terminal UE-a.

In other words, the CABS1 refers to the counterpart information which has already been registered in the CABS1 in advance, based on the information of the terminal UE-b included in the "SETUP", and judges whether or not the terminal UE-b is registered as a terminal subordinated to the CABS2 (whether the IP address of the CABS2 corresponding to the identification information of the terminal UE-b is registered).

In this case, the CABS1 can read out the IP address of the CABS2 corresponding to the identification information of the terminal UE-b. Then, the CABS1 transmits the SETUP message which is addressed to the IP address of the CABS2 thus read out (S203). The CABS2 transmits a "PAGE REQUEST" as a call request to the terminal UE-b (S204) and also transmits a "SETUP ACK" with respect to the "SETUP" (S205).

As described above, the operation is substantially similar to that of FIG. 5, except that messages are exchanged between the CABS1 and the CABS2 due to the lack of the CA server. Note that, in the second mode, it is not necessary for each CABS to operate as if the CABS itself were an IP telephone terminal, with respect to the CA server. Accordingly, the protocol conversion function as described in the first mode is not an indispensable constituent element.

As described above, in the third case, according to the network system shown in FIG. 8, in the case where the CABS1 as a radio base transceiver station and a called terminal (the terminal UE-b) corresponding to a calling request (SETUP) received by the CABS1 from the terminal UE-a as a calling terminal are capable of receiving the calling request by using another radio base transceiver station (CABS2) different from the CABS1 but connected to the same IP network to which the CABS1 is also connected, the system functions as a system for establishing a data transmission line between mobile telephone terminals, the system being provided with a trial unit to try to establish a data transmission line between the CABS1 and the CABS2 through the ISP 1. In the third case, the CABS1 realizes the function of the trial unit.

Fourth Case

Figure 10:
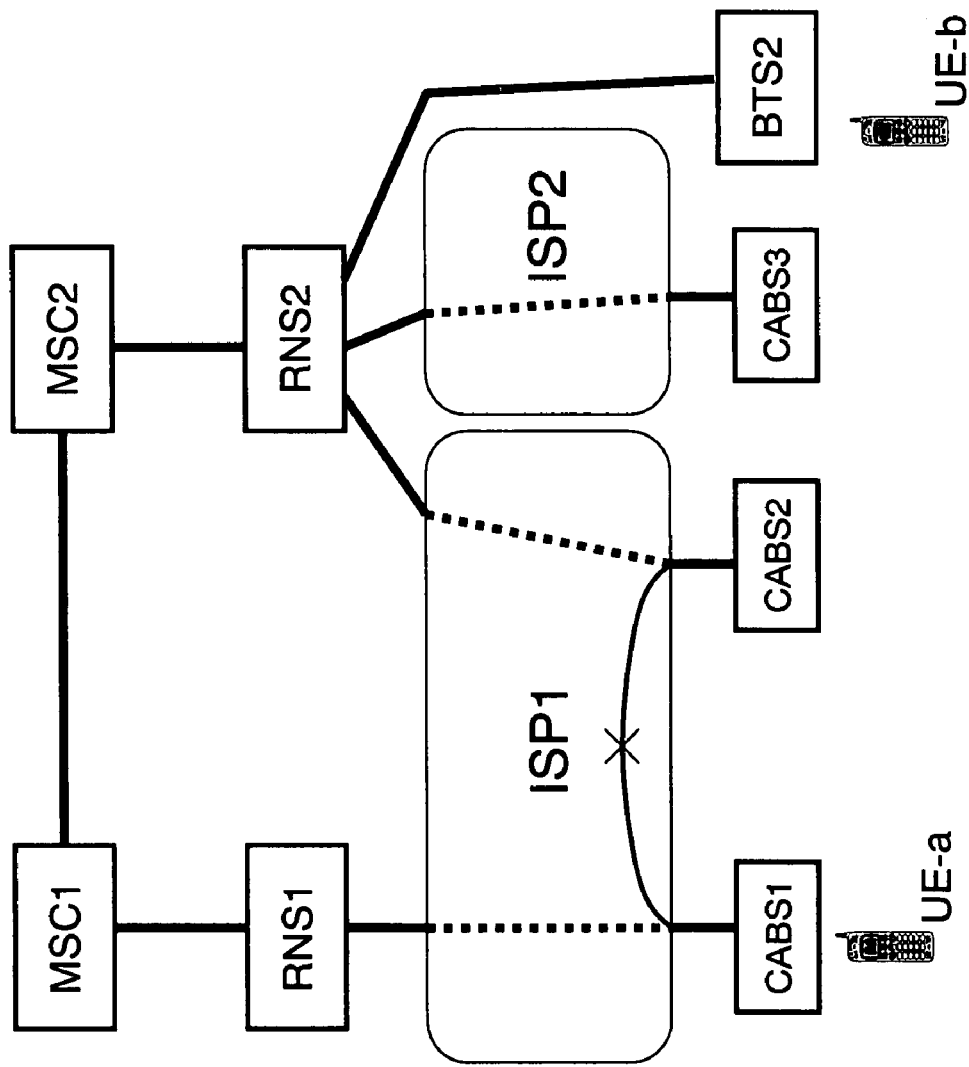
FIG. 10 is a view showing an exemplary network configuration for illustrating the second mode of the present invention, and showing a case (fourth case) where terminals can be connected directly through a CABS.
Figure 11:
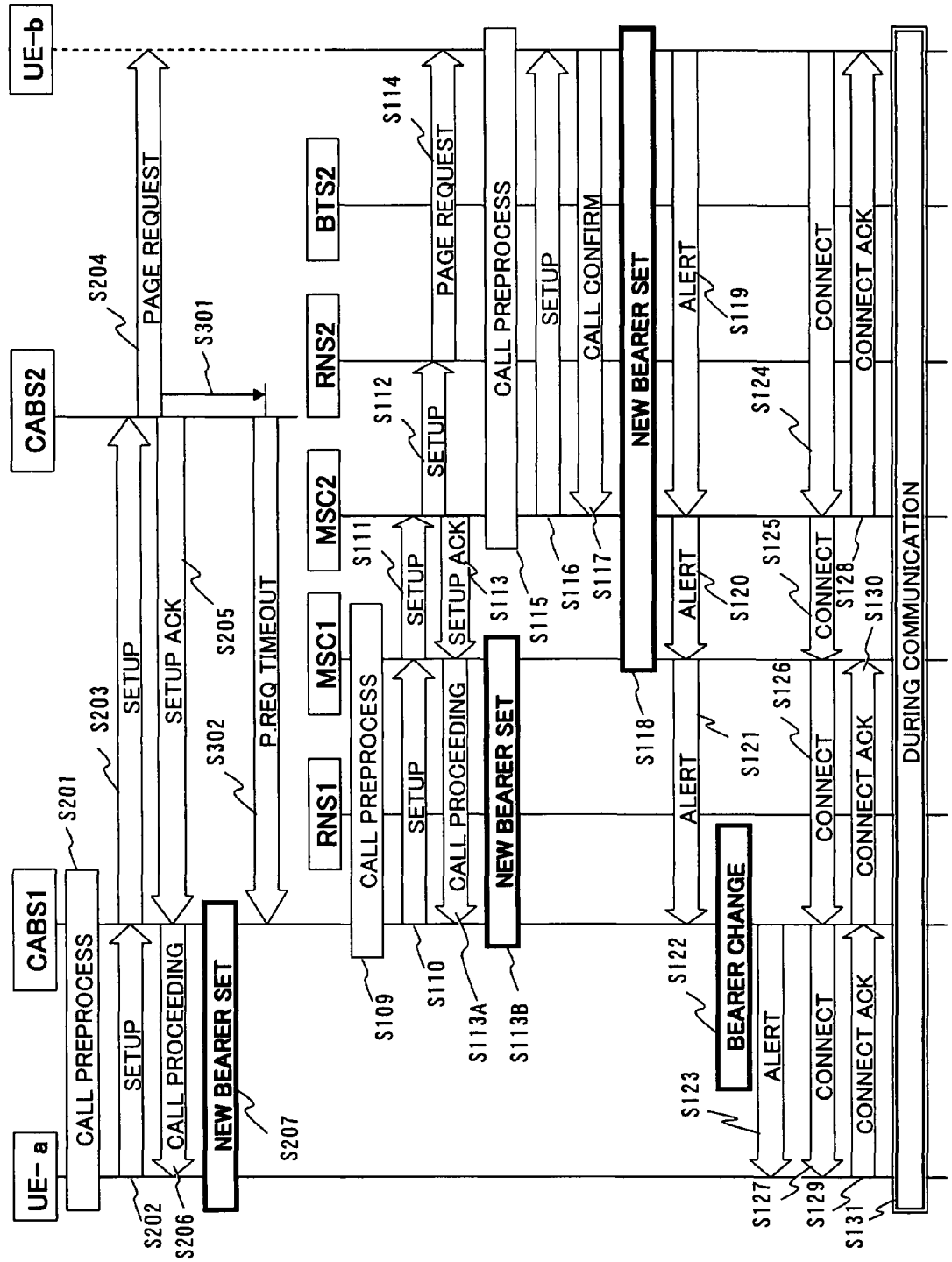
FIG. 11 is a sequence diagram illustrating the second mode of the present invention, which corresponds to FIG. 10.

FIG. 10 is an explanatory diagram showing a case (a fourth case) where the terminal UE-b is not subordinated to the CABS2 but is subordinated to a general BTS 2, in the network structure shown in FIG. 8, according to the second mode. FIG. 11 is a sequence diagram showing an operation according to the fourth case. The fourth case corresponds to the second case of the first mode.

The operation through S201 to S207 shown in FIG. 11 is similar to that of the third case. However, as shown in FIG. 10, the terminal UE-b as a called terminal is not subordinated to the CABS2. Therefore, in the CABS2, a timer which is activated upon the transmission of the "PAGE REQUEST" (S204) times out (S301). In this case, the CABS2 transmits a time-out message to the CABS1 (S302).

Upon receiving the time-out message, the CABS1 determines that the terminal UE-b does not exist under the CABS2, and performs the call connection process (signaling) in place of the terminal UE-a, similarly to the CABS1 of the second case.

As shown in FIG. 11, the operation to be performed by the CABS1 after the CABS1 has determined that the terminal UE-b does not exist under the CABS2 is similar to that of the second case shown in FIG. 7 (FIG. 11; S109 to S131). Therefore, a description thereof is omitted.

According to the second mode described above, as shown in the third case, call connection (establishment of a data transmission line) is performed between the CABSs not by way of the mobile telephone network even in the case of not using the CA server, to thereby perform data transmission/reception between terminals.

Also, as shown in the fourth case, even in the case where the counterpart terminal does not exist under the counterpart CABS, it is possible to allow the calling terminal and the called terminal to communicate with each other.

In the third case described above, the data transmission line established between the terminal UE-a and the CABS1 corresponds to the first data transmission line, and the data transmission line established between the CABS1 and the terminal UE-b corresponds to the second data transmission line.

As described above, in the fourth case, according to the network system shown in FIG. 8, in the case where the data transmission line cannot be established between the CABS1 and the CABS2, the system functions as a system for establishing a data transmission line between mobile telephone terminals, the system being provided with a unit (establishing unit) to establish an alternative data transmission line through the mobile telephone network and the IP network. The establishing unit is realized by the CABS1.

Third Mode

Next, a third mode of the present invention is described. In the first mode and the second mode, counterpart (destination) information (the IP address of the CABS and identification information of a counterpart terminal) needs to be registered in the CA server or in the CABS.

However, in originating a call, there may be a case where the counterpart information corresponding to the calling is not registered in the CA server or in the CABS. In this case, the CA server or the CABS on the calling side determines that the call cannot be accomplished (the call process cannot be performed because the destination is unknown in the first place), without waiting for the timeout at the called side shown in FIG. 7 or FIG. 11, and the call is originated by using the original mobile telephone network.

Figure 12:
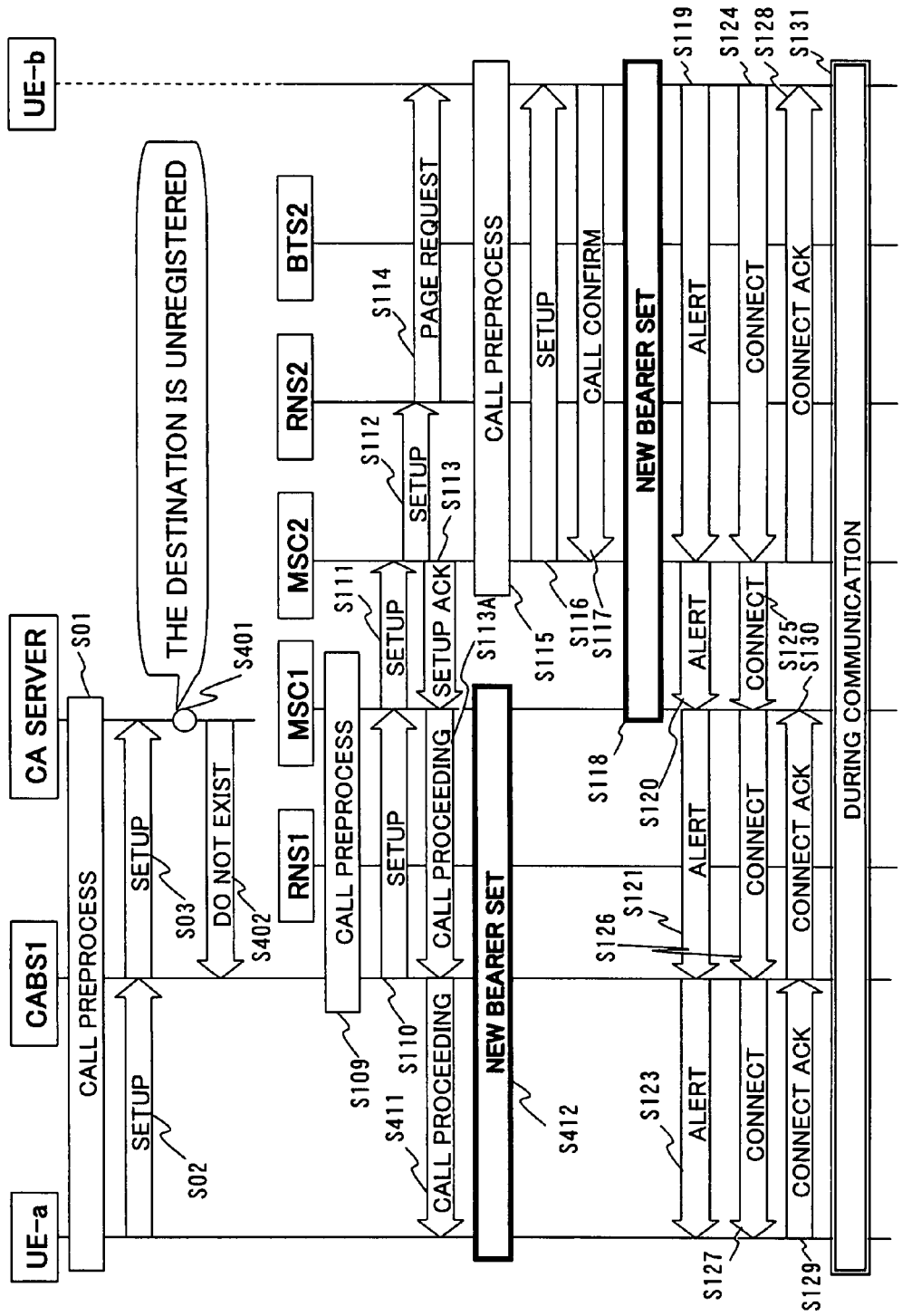
FIG. 12 is a diagram showing a sequence of a third mode (case where a called side is unregistered in the first mode) of the present invention.
Figure 13:
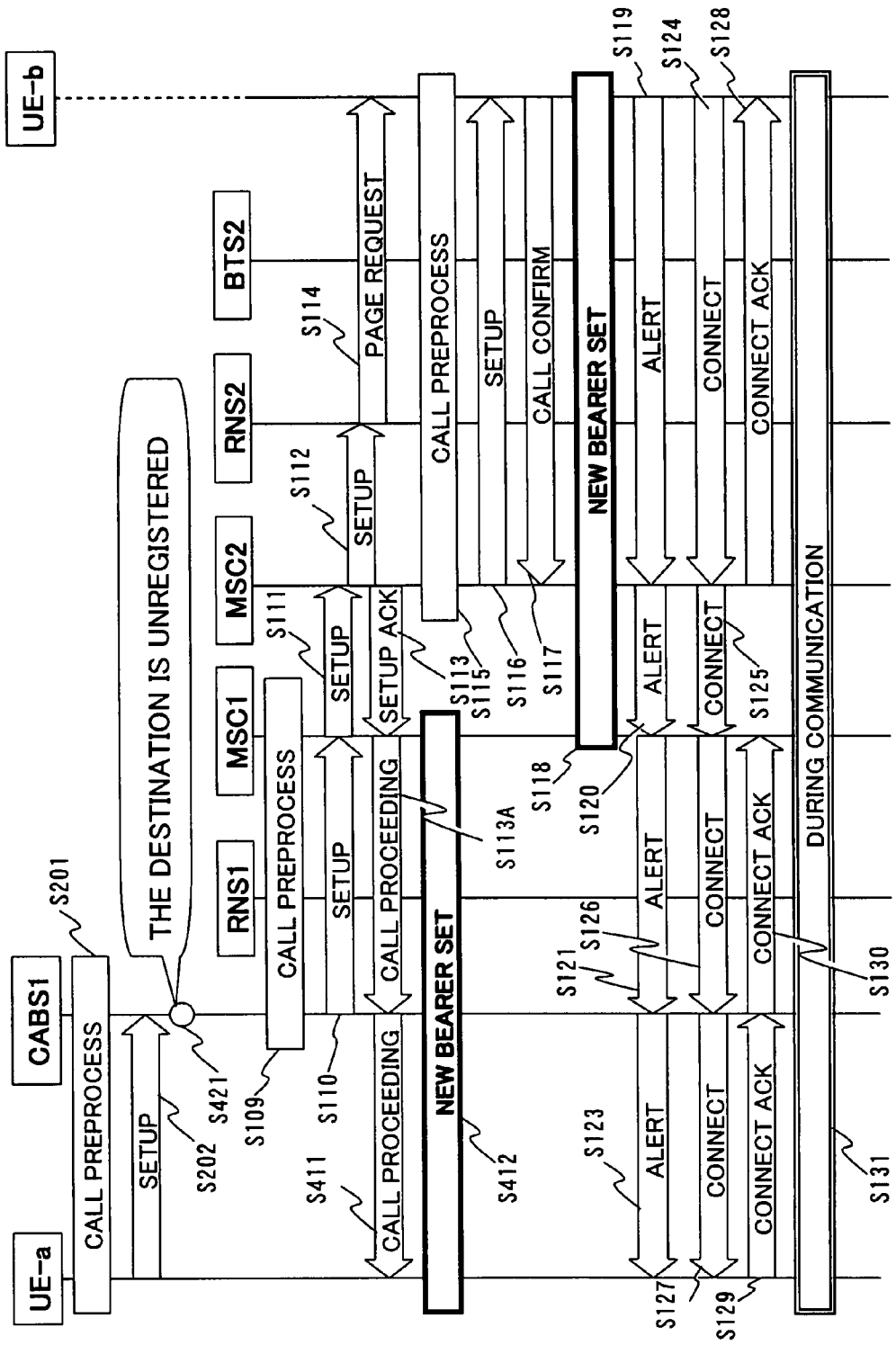
FIG. 13 is a diagram showing a sequence of the third mode (case where a called side is unregistered in the second mode) of the present invention.

A sequence according to the third mode is shown in FIG. 12 and FIG. 13. FIG. 12 is a sequence diagram showing a case where the counterpart information corresponding to a calling request is not registered in the CA server in the first mode.

As shown in FIG. 12, upon receiving the SETUP message from the CABS1 (S03), the CA server identifies the destination CABS based on the identification information included in the SETUP, the information relating to the counterpart terminal UE-b.

At this time, when the CA server judges that the destination CABS is not registered (when the CA server cannot identify the destination: S401), the CA server sends back an absence message ("Don't Exist" of FIG. 12) to the CABS1 (S402), the massage indicating that the destination does not exist.

Upon receiving the absence message, the CABS1 performs an operation similar to the operation from S109 to S113A described in the second case (FIG. 7). Note that, unlike in the second case (FIG. 7), the CABS1 has no chance to transmit the "CALL PROCEEDING" to the terminal UE-a upon receiving the "SETUP ACK" from the CA server.

For this reason, the CABS1 transmits the "CALL PROCEEDING" to the terminal UE-a (S411) upon receiving the "CALL PROCEEDING" from the MSC1. When the "CALL PROCEEDING" is transmitted from the CABS1, a radio bearer for data transmission is established between the terminal UE-a and the MSC 1 through the CABS1 and the RNS 1 (S412). As described above, the timing for establishing the radio bearer between the terminal UE-a and the CABS1 is different from that of the second case.

A subsequent operation to be performed before reaching "During Communication" is substantially similar to that of the second case (FIG. 7). Note that the CABS1 is similar to that of the second case in that the CABS1 deciphers and re-ciphers messages and data which go through the CABS1 itself.

FIG. 13 is a sequence diagram showing, as the third mode, an operation example performed in the second mode (in which the CA server in the ISP network is not used) in a case where the counterpart information corresponding to a calling request is not registered in the CABS on the calling side.

In FIG. 13, similarly to the fourth case (FIG. 11), the CABS1 performs the preprocesses with the terminal UE-a (S201), and receives a "SETUP" signal as a calling request to the terminal UE-b (S202).

In this case, when the CABS1 judges that the CABS2 is not registered as counterpart information with respect to the terminal UE-b (determines that the call cannot be accomplished (destination unregistered)) (S421), the CABS1 performs a procedure for establishing a bearer for data transmission between terminals by using the mobile telephone network. This procedure is similar to the procedure in and after S109 shown in FIG. 12, and the description thereof is omitted accordingly.

Fourth Mode

According to the description of the first to third modes, information of CABSs (IP addresses of the CABSs) is registered in the CA server or in the CABS as data registering the destination of the terminal. According to explanations of the first to third modes, the called terminal and the CABS on the called side correspond in one-to-one relation with each other. However, this relation of correspondence may also be one-to-N (N is a natural number).

In other words, a plurality of CABSs may be registered as CABS on the called side with respect to a certain terminal. In this case, the CA server or the CABS on the calling side transmits a call request to all the CABSs registered, and communicates with any CABS which has responded to the call request.

Also, when there is received no response from any one of the CABSs to which the call request has been sent, the CA server or the CABS on the calling side may switch to the mobile telephone network so as to originate a call.

As described above, a certain terminal registers all the CABSs possibly existing under the terminal, whereby the convenience of the terminal for a user can be enhanced.

EFFECTS OF THE INVENTION

According to the present invention, it is possible to secure a bearer (a data transmission line) directly between CABSs (not by way of the mobile telephone network), without changing a configuration of an existing terminal and each device constituting the mobile telephone network (except the CABS).

Therefore, it is possible to reduce traffic in the ISP network and traffic in the mobile telephone network, and the number of calls to be connected can be increased accordingly.

Also, when traffic based mainly on the ISP is established, the ISP is more likely to be given benefit. By using the ISP, an overall installation of the system can be reduced, leading to cost reduction, to thereby increase the profit of a mobile telephone carrier, which is likely to be returned to users.

Therefore, the present invention brings mutual benefit for the mobile telephone carrier, the ISP, and the user.

EMBODIMENTS OF THE PRESENT INVENTION

Hereinafter, the present invention will be described by way of embodiments. As the embodiments of the present invention, a specific sequence in a third-generation mobile telephone network (hereinafter, referred to as "3GNW") will be illustrated. As a protocol in an ISP (IP network), the case where an SIP protocol adopted most widely in IP telephones is applied is assumed.

First Embodiment

Figure 14:
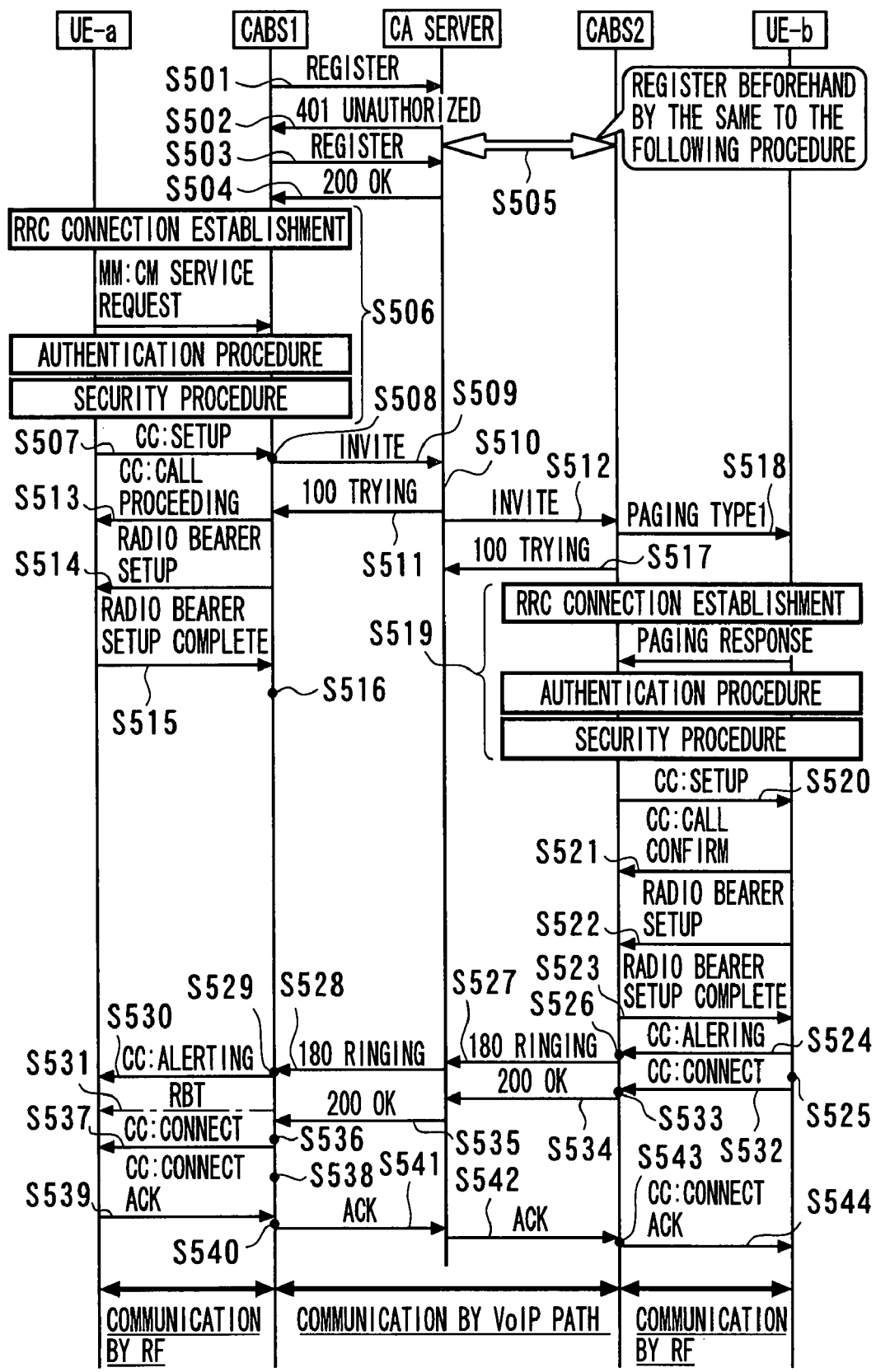
FIG. 14 is a sequence diagram showing a first embodiment (embodiment of the case (first case) where CABS direct connection can be performed in the first mode) of the present invention.

As a first embodiment, an embodiment corresponding to a first case in the first mode will be described. FIG. 14 shows a sequence in the case where a terminal UE-a is placed under the command of CABS1, and a terminal UE-b is placed under the command of CABS2 in a network configuration as shown in FIG. 4.

More specifically, FIG. 14 shows the case where direct communication (establishment of a data transmission line) can be performed between the CABS1 and the CABS2 via a call agent server (CA Server) in an ISP network.

First, each of the CABS1 and the CABS2 registers a terminal capable of using a CABS in the CA server (registration procedure). In accordance with the registration procedure, information used as counterpart information is registered in the CA server. The information to be registered as the counterpart information includes an IP address of a CABS, identification information (e.g., a telephone number) of a terminal capable of using the CABS, and other required pieces of information. The contents of the information to be registered are determined, for example, on the CA server side.

The specific procedure of the registration procedure is as follows. FIG. 14 shows a registration procedure by the CABS1 as an example. In the case where the CABS1 registers the CABS1 and a terminal capable of using the CABS1, the CABS1 sends a registration request through an SIP message (message "REGISTER" of FIG. 14) to the CA server (S501).

The CA server sends an information key once with respect to the "REGISTER (SIP message)" from the CABS1 through a "401 unauthorized" message, thereby urging the CABS1 to send the information to be registered (S502).

The CABS1 sends the REGISTER message with the information to be registered again in accordance with the "401 unauthorized" (S503). The CA server extracts the information to be registered from the "REGISTER", and registers it at a predetermined registration position in the CA server. For example, the CA server registers the information to be registered in a registration table.

When completing the registration, the CA server sends a message "200 OK" to the CABS1 (S504). Thus, the registration procedure is completed. Consequently, a terminal UE-a capable of using the CABS1 is registered in the CA server.

The above-mentioned terminal registration procedure (S501-S504) is also performed between the CABS2 and the CA server (S505). Consequently, the CABS2 registers a terminal UE-b in the CA server as a terminal capable of using the CABS2.

The above-mentioned registration procedure in S501-S504 (S505) is performed only once in the case where the CABS is connected initially to the IP network.

When the terminal UE-a is placed under the command of the CABS1 and performs a calling, CALL PREPROCESS is performed (S506). Specifically, a radio rink for control is set between the terminal UE-a and the CABS1, and Authentication Procedure and Security Procedure for determining a key for ciphering are performed.

Such a preprocess is not different from the one performed before the calling of an existing mobile telephone, seen from the terminal UE-a. It should be noted that, originally, such a preprocess is performed between the terminal UE-a and an RNS or MSC that is an higher-order device of the CABS1, in the case where the CABS1 is assumed to be an ordinary base transceiver station (BTS).

In S506, the CABS1 terminates a signal for the preprocess from the terminal UE terminal UE-a, and performs the preprocess between the terminal UE-a and the CABS1 in place of the RNS/MSC. In this manner, the CABS1 has a function of performing the preprocess between the CABS1 and the terminal, and prevents processes such as the network authentication of the terminal UE-a and the determination of an cipher key from being performed in the mobile telephone network.

Consequently, a control traffic for signaling is prevented from occurring in the mobile telephone network. The above-mentioned preprocess by the CABS1 can be realized by providing the CABS with the function regarding a preprocess of the RNS or the MSC.

FIG. 14 shows an example in which an authentication request is not sent to the CA server (CA server does not deal with network authentication).

When the preprocess is completed, the terminal UE-a sends "SETUP" that is a calling request including a counterpart telephone number (identification information on the terminal UE-b) to the CABS1 (S507).

When receiving the "SETUP" from the terminal UE-a, the CABS1 converts the "SETUP" into an INVITE message that is a calling request message of the SIP (S508), and sends it to the CA server (S509).

The CA server analyzes the INVITE message from the CABS1, and checks whether or not a calling side and a called side have been registered (S510). Specifically, for example, the CA server specifies an IP address of the calling-side CABS (CABS1) from the calling-side address of the INVITE message. Further, the CA server specifies a calling terminal from the telephone number of the calling terminal included in the INVITE message. By determining whether or not entries of the counterpart information including the IP address and the telephone number have been registered in a registration table, the CA server determines whether or not a CABS+ terminal on the calling side have been registered.

On the other hand, the CA server searches for entries of counterpart information including an IP address of the corresponding CABS from the registration table, using the telephone number of the destination terminal included in the INVITE message as a key. Consequently, the CA server can determine whether or not the CABS+terminal on the called side have been registered.

Herein, due to the above-mentioned registration procedure (S501-S504, S505), the corresponding information on the calling side and the called side are registered. Thus, the CA server determines that the calling side and the called side of the calling request have been registered, and determines the IP address of the CABS2 corresponding to the telephone number of the destination terminal (terminal UE-a) as an destination address of the calling request.

Then, the CA server sends a 100 Trying message indicating that the process is being performed to the CABS1 (S511). Further, the CA server sends the INVITE message to the IP address of the CABS2 to start a calling operation (S512).

When receiving the 100 Trying message, the CABS1 recognizes that the calling request has been received, and notifies the terminal UE-a that the calling request has been received through a CALL PROCEEDING message.

Then, an establishment procedure of a radio bearer between the CABS1 and the terminal UE-a is executed. That is, the CABS1 sends a RADIO BEARER SETUP message (S514). The terminal UE-a returns a RADIO BEARER SETUP COMPLETE message in response to the RADIO BEARER SETUP message (S515). Consequently, the radio bearer between the terminal UE-a and the CABS1 is established. At this time, in the CABS1, the connection destination of the radio bearer is set in a Tone generating unit in the CABS1 (S516).

On the other hand, when receiving the INVITE message (S512), the CABS2 returns the 100 Trying message to the CA server (S517). Further, the CABS2 sends a Paging Type 1 message that is a receiving request, with a destination telephone number (telephone number of UE-b) in the INVITE message (S518).

When receiving the Paging Type 1 message, the terminal UE-b starts a CALL PREPROCESS between the terminal UE-b and the CABS2 (S519). This preprocess is the same process as the preprocess (S506) performed between the terminal UE-a and the CABS1.

When the preprocess is completed, a SETUP message contained in the calling-side information (information on the terminal UE-a: contained in the INVITE (S512)) is sent from the CABS2 to the terminal UE-b (S520).

The terminal UE-b responds to the SETUP message through a CALL CONFIRM message (S521). After that, in order to establish a radio bearer, the RADIO BEARER SETUP message is sent from the CABS2 to the terminal UE-b (S522), and the terminal UE-b responds with the RADIO BEARER SETUP COMPLETE message (S523). As a result, a radio bearer is established between the CABS2 and the terminal UE-b.

When the radio bearer is established, the terminal UE-b sends an ALERTING message to the CABS2 (S524). Simultaneously with this, the terminal UE-b sounds a ring tone of the terminal (S525), thereby notifying a user of the terminal UE-b that the ALERTING message has been received.

The ALERTING message is converted into a 180 Ringing message corresponding to a calling message of the SIP in the CABS2 (S526), and sent to the CA server (S527). The 180 Ringing message is sent to the CABS1 via the CA server (S528).

The CABS1 returns the 180 Ringing message to the ALERTING message (S529), and sends it to the terminal UE-a (S530). At this time, the CABS1 sends a Ring Back Tone (RBT) from a Tone generating unit in the CABS1 to the radio bearer of the terminal UE-a (S531). Thus, the RBT can be heard from a speaker of the UE-a.

When the terminal UE-b responds to the call by off-hook, a CONNECT message is sent to the CABS2 (S532). The CABS2 converts the CONNECT message into a 200 OK message that is a response message of the SIP (S533), and sends it to the CA server (S534). The CA server transfers the 200 OK message from the CABS2 to the CABS1 (S535).

The CABS1 returns the 200 OK message to the CONNECT message (S536), and sends it to the terminal UE-a (S537). Simultaneously with this, the CABS1 connects the radio bearer with the terminal UE-a to the CABS2 side (S538). Consequently, the terminal UE-a can recognize a response with respect to the calling and can start communication using the radio bearer.

The terminal UE-a sends a CONNECT ACK message with respect to the CONNECT message to the CABS1 (S539). The CABS1 converts the CONNECT ACK message into an ACK message based on the SIP (S540), and sends it to the CA server (S541).

The CA server transfers the ACK message to the CABS2 (S542). The CABS2 converts the ACK message into the CONNECT ACK message (S543), and sends it to the terminal UE-b (S544). As a result, the terminal UE-b becomes communicable.

Accordingly, at a time when the 200 OK message reaches the CABS1, it is recognized that a substantial bearer has been established between the CABS1 and the CABS2, and voice data can be transmitted/received.

That is, a voice data communication line is formed of the radio bearer between the terminal UE-a and the CABS1 and between the CABS2 and the terminal UE-b, and a path (substantial data transmission line) by VoIP is formed between the CABS1 and the CABS2, and voice communication in both directions can be performed between the terminal UE-a and the terminal UE-b.

Figure 15:
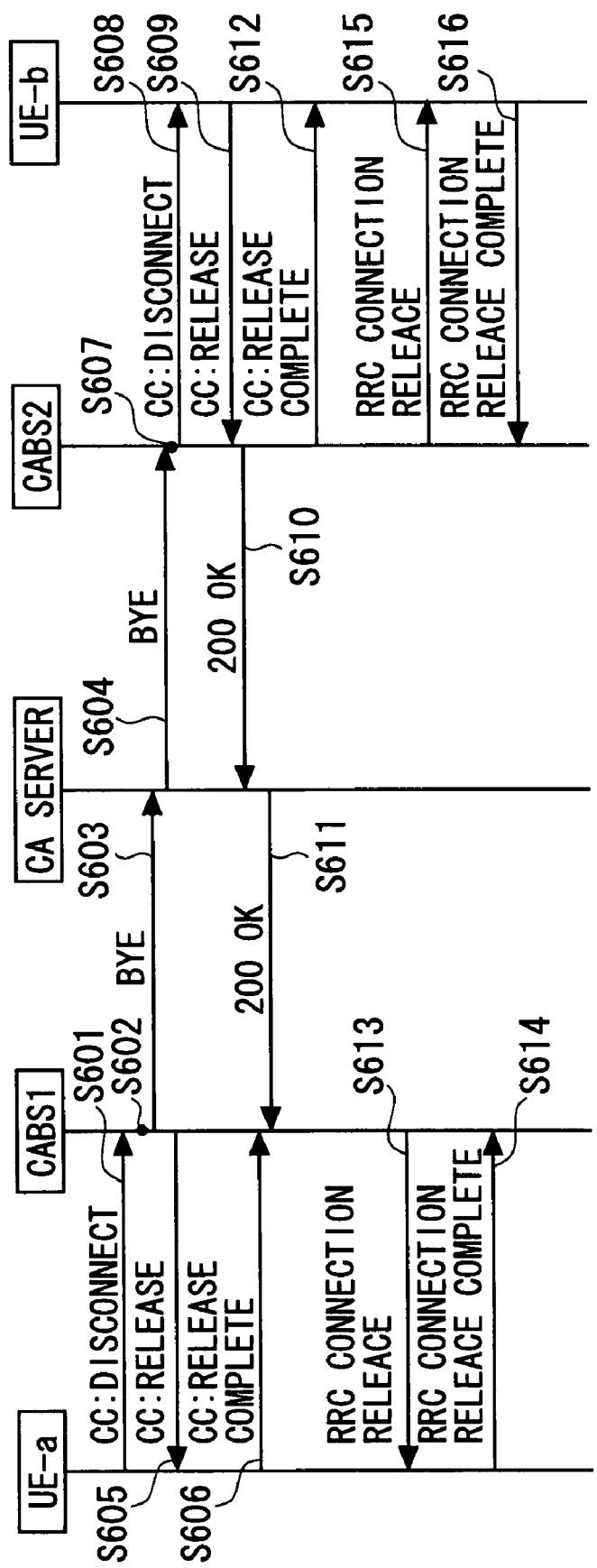
FIG. 15 is a sequence diagram showing the first embodiment (embodiment of the case (first case) where CABS direct connection can be performed in the first mode) of the present invention.

FIG. 15 shows a disconnection sequence from the state during communication shown in FIG. 14. In FIG. 15, when the user of the terminal UE-a performs off-hook (disconnection operation), a DISCONNECT message is sent from the terminal UE-a to the CABS1 (S601).

The CABS1 converts the DISCONNECT message into a BYE message of an SIP protocol (S602), and sends it to the CA server (S603). The BYE message is sent to the CABS2 via the CA server (S604).

Further, the CABS1 sends a RELEASE message to the terminal UE-a (S605), and the terminal UE-a returns a RELEASE COMPLETE message to the CABS1 (S606). As a result, it is recognized that disconnection processing has been agreed.

The CABS2 having received the BYE message converts the BYE message into a DISCONNECT message (S607), and sends it to the terminal UE-b (S608). The terminal UE-b responds with a RELEASE message (S609).

Then, the CABS2 sends a 200 OK message that is a response to the disconnection (response message to the BYE message) to the CABS1 via the CA server (S610, S611).

When the CABS1 receives the 200 OK message, the disconnection between the CABS1 and the CABS2 is completed. On the other hand, the CABS2 sends the RELEASE COMPLETE message to the terminal UE-b to notify the CABS2 of the agreement on the disconnection (S612).

The CABS1 in which the disconnection has been agreed requests the disconnection of a radio control link by sending an RRC Connection release message in order to disconnect the radio control link between the CABS1 and the terminal UE-a (S613).

The terminal UE-a responds with an RRC Connection release complete message with respect to the RRC Connection release message, thereby releasing the radio control link between the CABS1 and the terminal UE-a (S614).

Similarly, the RRC Connection release message and the RRC Connection release complete message are transmitted/received between the CABS2 and the terminal UE-b (S615, S616), and the radio control link between the CABS2 and the terminal UE-b is released.

As illustrated in FIGS. 14 and 15, the sequence among the CABS1, CA server, and CABS2 is not different from the calling/reception/disconnection control by the SIP protocol (note that a part of the parameters in a message is added, and the process for the CA server to refer to an additional parameter is added).

Further, the calling/reception/disconnection sequence seen from each of the terminals UE-a and UE-b is not different from the calling/reception/disconnection operation in the current mobile telephone network.

The CA server can be altered by adding the process of receiving information to be registered from the CABS to register it at a predetermined position in accordance with the above-mentioned registration procedure, and the process for the CA server to refer to the telephone number of a destination terminal included in the INVITE from the CABS, determine whether or not the CABS of the counterpart corresponding to the telephone number has been registered, and send a message in accordance with the determination results to the predetermined destination. The processes can be realized by altering software (program) mounted on the CA server. Further, special hardware dealing with the processes may be mounted.

Second Embodiment

As a second embodiment, an embodiment corresponding to a second case in the first mode mentioned above will be described.

Figure 16:
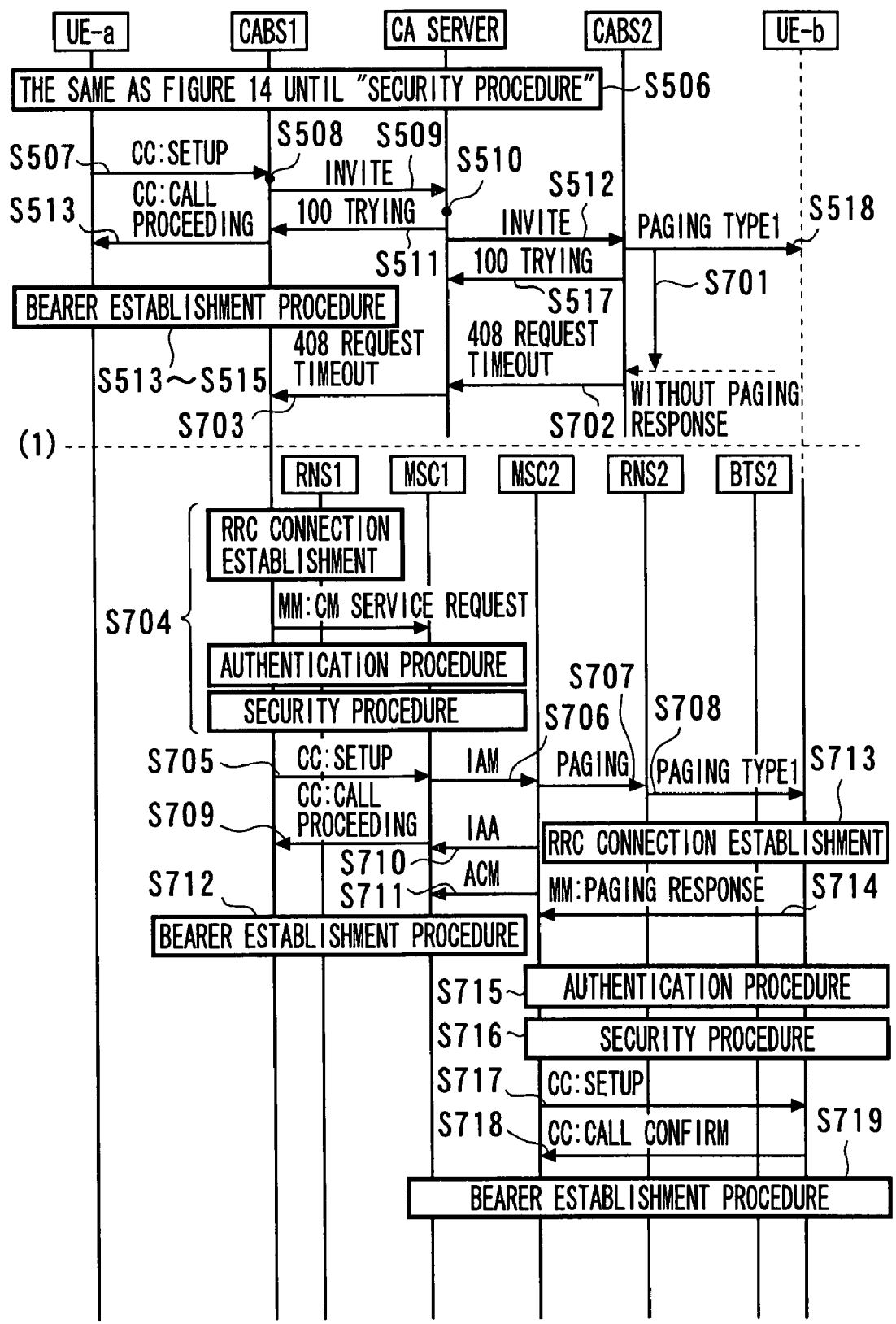
FIG. 16 is a sequence diagram showing a second embodiment (embodiment of the case (second case) where CABS direct connection cannot be performed in the first mode) of the present invention.
Figure 17:
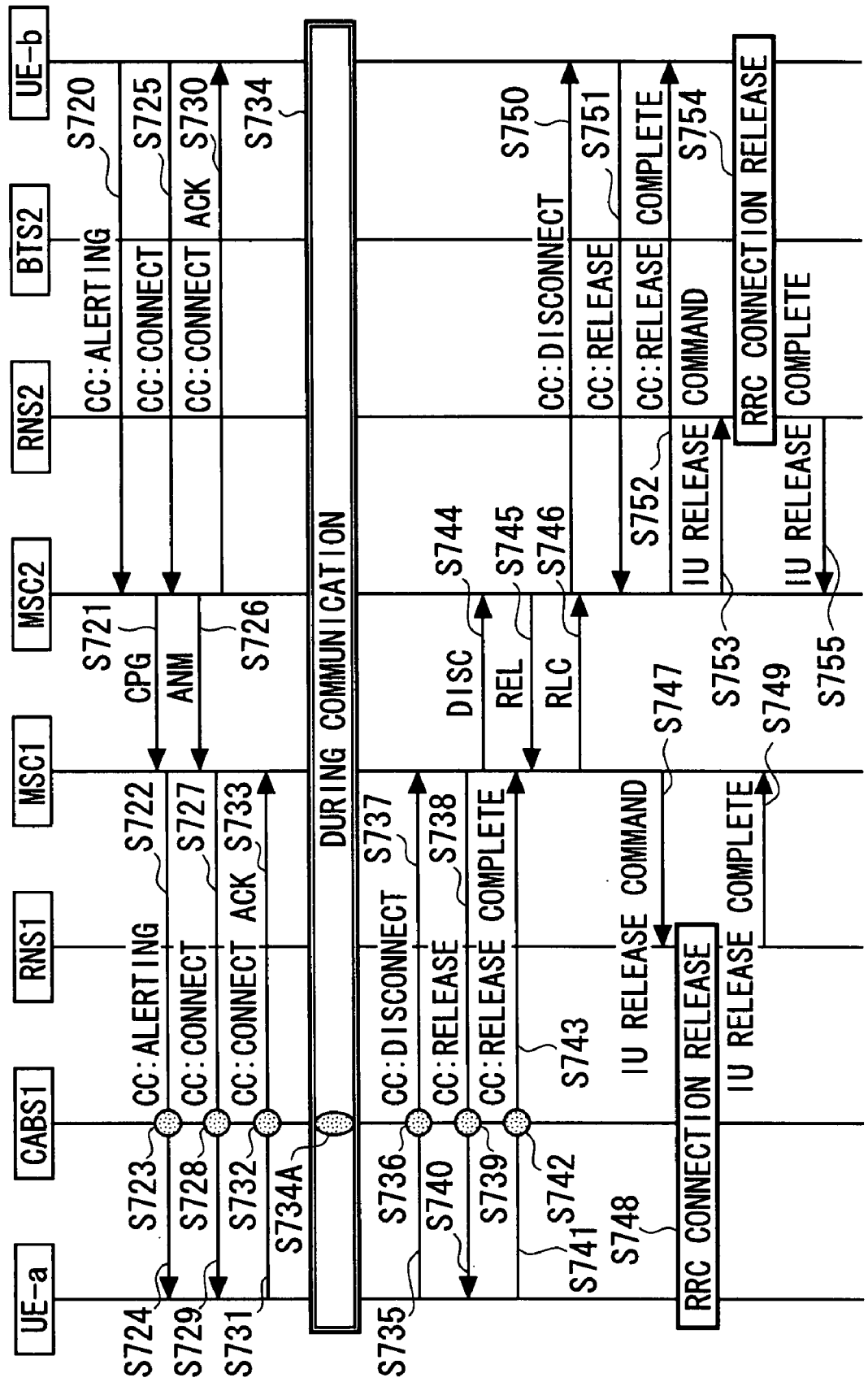
FIG. 17 is a sequence diagram showing the second embodiment (embodiment of the case (second case) where CABS direct connection cannot be performed in the first mode) of the present invention.

FIGS. 16 and 17 show a sequence in the case where the terminal UE-b of a destination is placed under the command of the BTS2 instead of the CABS2 as shown in FIG. 6. That is, in this sequence, the direct communication between the CABSs is impossible, and the CA server is present.

In the sequence of FIG. 16, it is assumed that the CABS1/2 and the terminal UE-a/b under the command thereof are previously registered with respect to the CA server in accordance with the registration procedure (S501-S504, S505) shown in FIG. 14.

The procedure in which the terminal UE-a starts the preprocess so as to request a calling (S506) and sends a SETUP message (S507), and the SETUP message is converted into an INVITE message in the CABS1 (S508), sent to the CA server (S509), and sent to the CABS2 (S512) is the same as that of FIG. 14.

The CABS2 sends a Paging Type 1 message to the lower-order range (communication range of the CABS2) as a receiving request (S518). However, there is no terminal UE-b that is to respond to the message. Therefore, the CABS2 cannot receive a response message "Paging Response" from the terminal UE-b.

When transmitting the Paging Type 1 message, the CABS2 sets a timer for receiving the "Paging Response" (S701). In this case, the timer times out. When detecting the time-out, the CABS2 recognizes that there is no terminal UE-b under the CABS2.

In this case, the CABS2 notifies the CA server of the time-out through a message "408 Request Timeout" based on the SIP (S702). The CA server sends the "408 Request Timeout" to the CABS1 (S703).

When receiving the "408 Request Timeout", the CABS1 determines that the communication with the terminal UE-b cannot be performed through the CABS2. Then, the CABS1 starts a calling procedure with respect to the mobile telephone network to which the CABS1 originally belongs. This procedure should be conducted so that a terminal seems to perform a calling operation ordinarily, seen from the RNS1/MSC1 side (FIG. 6).

Therefore, the CABS1 has a terminal operation function and uses it, and performs a calling operation in place of the UE-a, using the information obtained in the calling operation such as the preprocess conducted previously by the terminal UE-a.

That is, the CABS1 performs CALL PREPROCESS between the CABS1 and the RNS1 using the information obtained by the execution of the preprocess in S506 (S704), and sends "SETUP" that is a calling request to the MSC1 (S705).

Because of this, the mobile telephone network performs the same operation as that when an ordinary calling is performed, and allows the terminal UE-b positioned under the command of the BTS2 to receive the Paging Type 1 message (S706-708). The terminal UE-b can respond to the Paging Type 1 message. In S706, the "SETUP" is an IAM (address (Initial Address)) message that is one of B-ISUP (Broad-ISDN (Integrated Service Digital Network) User Part) messages applied to the MSC communication, and transferred from the MSC1 to the MSC2.

The procedure (S709-S719) thereafter is the same sequence as that of the ordinary calling/reception sequence of the mobile telephone network. Accordingly, a bearer for voice data communication is established between the CABS1 and the MSC1 (S712), and a bearer for voice data communication is established between the MSC1 and the terminal UE-b (S719).

When receiving the IAM message, the MSC2 sends an IAA (address acknowledgement (IAM acknowledgement)) message that is an acknowledgement message thereof to the MSC1 (S710). Further, the MSC2 sends an ACM (Address complete) message to the MSC1 (S711).

After that, as shown in FIG. 17, an ALERTING message indicating that the terminal UE-b is calling is sent from the terminal UE-b, and transmitted to the terminal UE-a via the mobile telephone network (S720-S724).

Further, taking the opportunity that the user of the terminal UE-b performs an off-hook operation, a CONNECT message indicating that a reception response of the terminal UE-b is sent from the terminal UE-b, and transmitted to the terminal UE-a via the mobile telephone network (S725-S729).

Then, the MSC2 having received the CONNECT message notifies the terminal UE-b of the response message "CONNECT ACK", and the terminal UE-a notifies the MSC1 of the "CONNECT ACK". Consequently, the terminal UE-a and the terminal UE-b are brought into the state during voice communication (S734).

In the sequence in S720-S724, the CABS1 once deciphers the ALERTING and CONNECT messages sent from the RNS1/MSC1 sides with the cipher determined when the CABS1 itself is operated as a terminal (in the preprocess in S704). Then, the CABS1 ciphers the ALERTING and CONNECT messages with the cipher determined in the preprocess (S506) performed by the CABS1 in place of the RNS1/MSC1 when the terminal UE-a performs a calling operation, and sends them to the terminal UE-a side (S723, S728).

On the contrary, the CABS1 deciphers the CONNECT ACK message from the terminal UE-a with the cipher determined in the preprocess (S506) with respect to the terminal UE-a, and ciphers the CONNECT ACK message with the cipher determined in the preprocess (S704) performed by the CABS1 as the terminal (S732).

After that, in the case of disconnecting the communication from the terminal UE-a side, the same procedure as that in the conventional example is performed between the terminal UE-a side and the terminal UE-b side (S735-S755).

A specific procedure is as follows. When the user of the terminal UE-a performs a disconnection operation (on-hook), a DISCONNECT message is sent from the terminal UE-a (S735). The CABS1 deciphers and ciphers again the DISCONNECT message (S736), and thereafter, sends it to the MSC1 via the RNS1 (S737).

The MSC1 sends the RELEASE message with respect to the DISCONNECT message to the terminal UE-a (S738). The RELEASE message is deciphered and ciphered again in the CABS1 (S739), and thereafter, sent to the terminal UE-a (S740).

The terminal UE-a sends a RELEASE COMPLETE message in response to the RELEASE message (S741). The CABS1 deciphers and ciphers again the RELEASE COMPLETE message (S742), and sends it to the MSC1 (S743). Thus, the bearer between the terminal UE-a and the MSC1 is released.

When receiving the RELEASE message from the terminal UE-a (CABS1), the MSC1 sends a DISC (disconnection) message to the MSCS2 (S744). The MSC2 returns an REL (release) message in response to the DISC message to the MSC1 (S745). Then, the MSC1 sends an RLC (release completion) message to the MSC2 (S746). Thus, the bearer between the MSC1 and the MSC2 is released.

The MSC1 sends an IU RELEASE COMMAND message for designating the release of the radio control link between the terminal UE-a and the RNS1 to the RNS1 (S747). Then, the release process of the radio control link is performed between the RNS1 and the terminal UE-a (S748). When the release process is completed, the MSC1 is notified of an IU RELEASE COMPLETE message indicating the completion of the release process from the RNS1 (S749).

The MSC2 sends a DISCONNECT message to the terminal UE-b in response to the DISC message from the MSC1 (S750). The terminal UE-b sends the RELEASE message in response to the DISCONNECT message to the MSC2 (S751). The MSC2 sends the RELEASE COMPLETE message in response to the RELEASE message to the terminal UE-b (S752). Thus, the bearer between the terminal UE-b and the MSC2 is released.

The MSC2 sends an IU RELEASE COMMAND message for designating the release of the radio control link between the terminal UE-b and the RNS2 to the RNS2 (S753). Then, the release process of the radio control link between the RNS2 and the terminal UE-b is performed (S754). When the release process is completed, the MSC2 is notified of the IU RELEASE COMPLETE message designating the completion of the release process from the RNS2 (S755).

In the above-mentioned operation, the CABS1 is operated as if the terminal RNS1/MSC1 is operated in the exchange with the terminal UE-a, and is operated as if the terminal UE-a is operated in the exchange with the RNS1/MSC1 side.

Therefore, the CABS1 needs to decipher and cipher again a message in the call connection sequence, voice data during communication, and a message regarding a disconnection sequence (S723, S728, S732, S734A, S736, S739, S742).

However, the sequence itself is not different from the exchange in the conventional mobile telephone network. If the CABS1 is used, the operations shown in FIGS. 16 and 17 can be performed without changing the terminals and the mobile telephone network.

Third Embodiment

Figure 18:
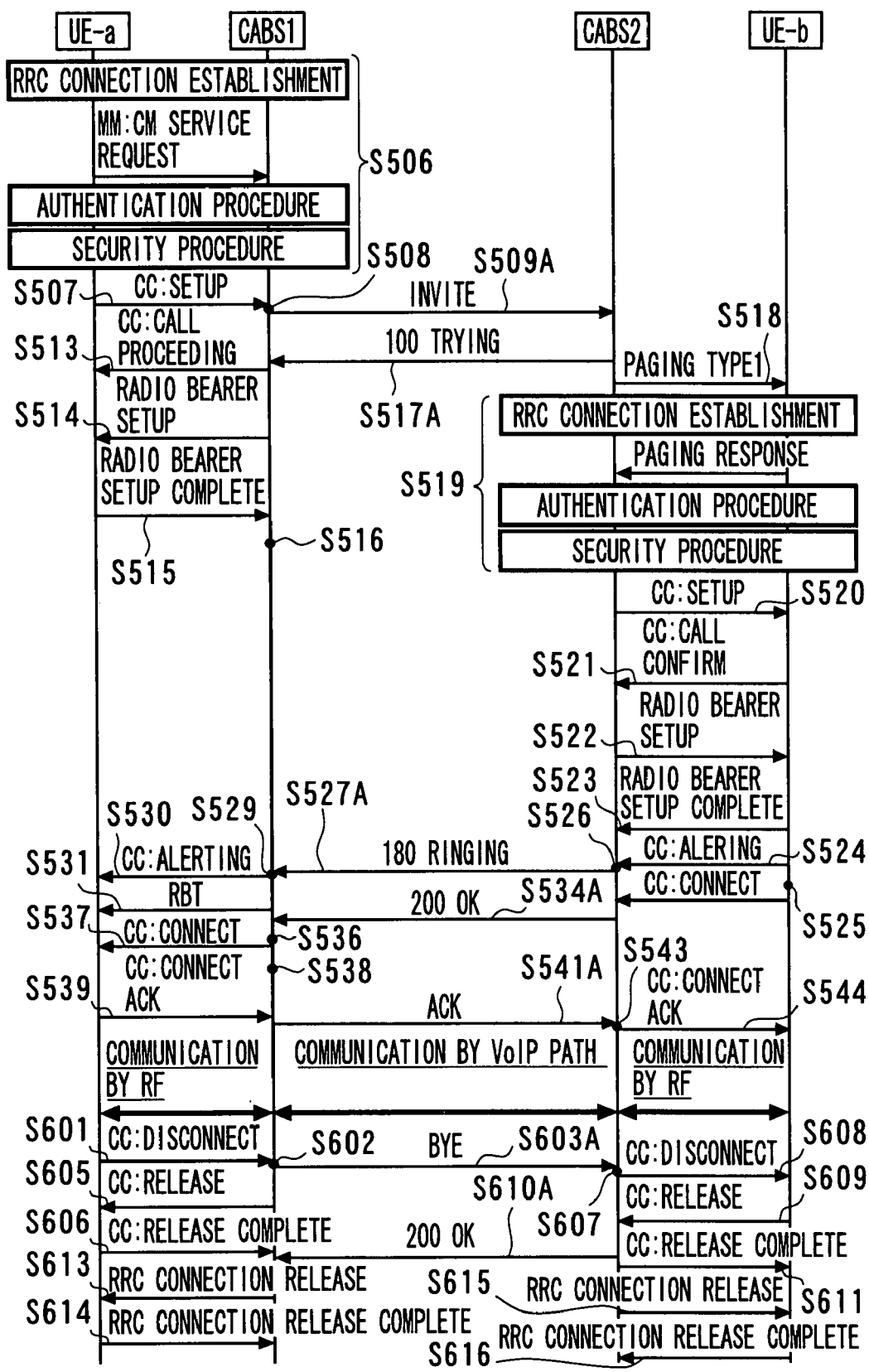
FIG. 18 is a sequence diagram of an embodiment in the case where CABS direct connection can be performed in the second mode of the present invention.

As a third embodiment, an embodiment corresponding to a third case in the above-mentioned second mode will be described. FIG. 18 shows a sequence in the case where the CA server is not used in the network configuration shown in FIG. 8.

When the sequence shown in FIG. 18 is compared with the sequence (FIG. 14) according to the first embodiment, the difference from the first embodiment only lies in that an SIP message is directly exchanged between the CABS1 and the CABS2 (see FIG. 18; S509A, S517A, S527A, S534A, S541A, S603A, S610A). Therefore, the detailed description thereof will be omitted.

In order to realize the sequence shown in FIG. 18, unlike the first embodiment, counterpart information such as an IP address of a called side and identification information (telephone number) of a terminal are previously registered in the CABS1 and the CABS2, and the CABS1 is configured so as to perform the process for the CABS1 to identify a destination, taking the opportunity of the reception of a calling request (S508).

Fourth Embodiment

Figure 19:
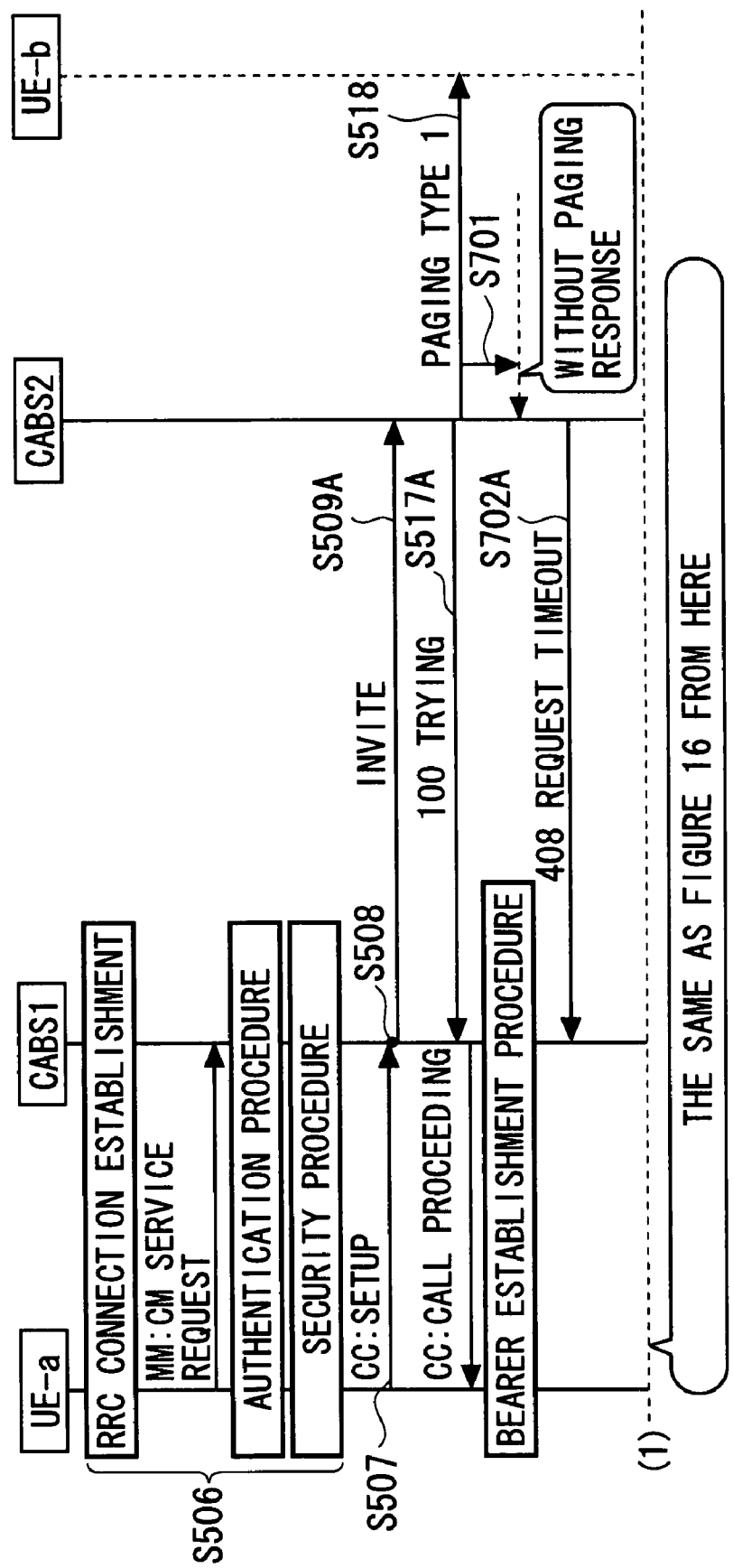
FIG. 19 is a sequence diagram of an embodiment in the case where CABS direct connection cannot be performed in the second mode of the present invention.

As a fourth embodiment, an embodiment corresponding to a fourth case in the above-mentioned second mode will be described. FIG. 19 shows a sequence in the case where a destination terminal (terminal UE-b) is not placed under the command of the CABS2 when the call control server is not used (see FIG. 10).

When the sequence shown in FIG. 19 is compared with the sequence (FIG. 16) of the second embodiment, the difference between the two sequences only lies in that an SIP message is directly exchanged between the CABS1 and the CABS2 (see FIG. 19; S509A, S517A, S702A).

As shown in FIG. 19, when the CABS1 receives a 408 Request Timeout message, the sequence after S704 shown in FIGS. 16 and 17 is executed. The description of this sequence is omitted.

Fifth Embodiment

As a fifth embodiment, an embodiment corresponding to the above-mentioned third mode will be described. The fifth embodiment is the case where counterpart information is not registered in the CA server in the first embodiment and the CABS in the second embodiment.

Figure 20:
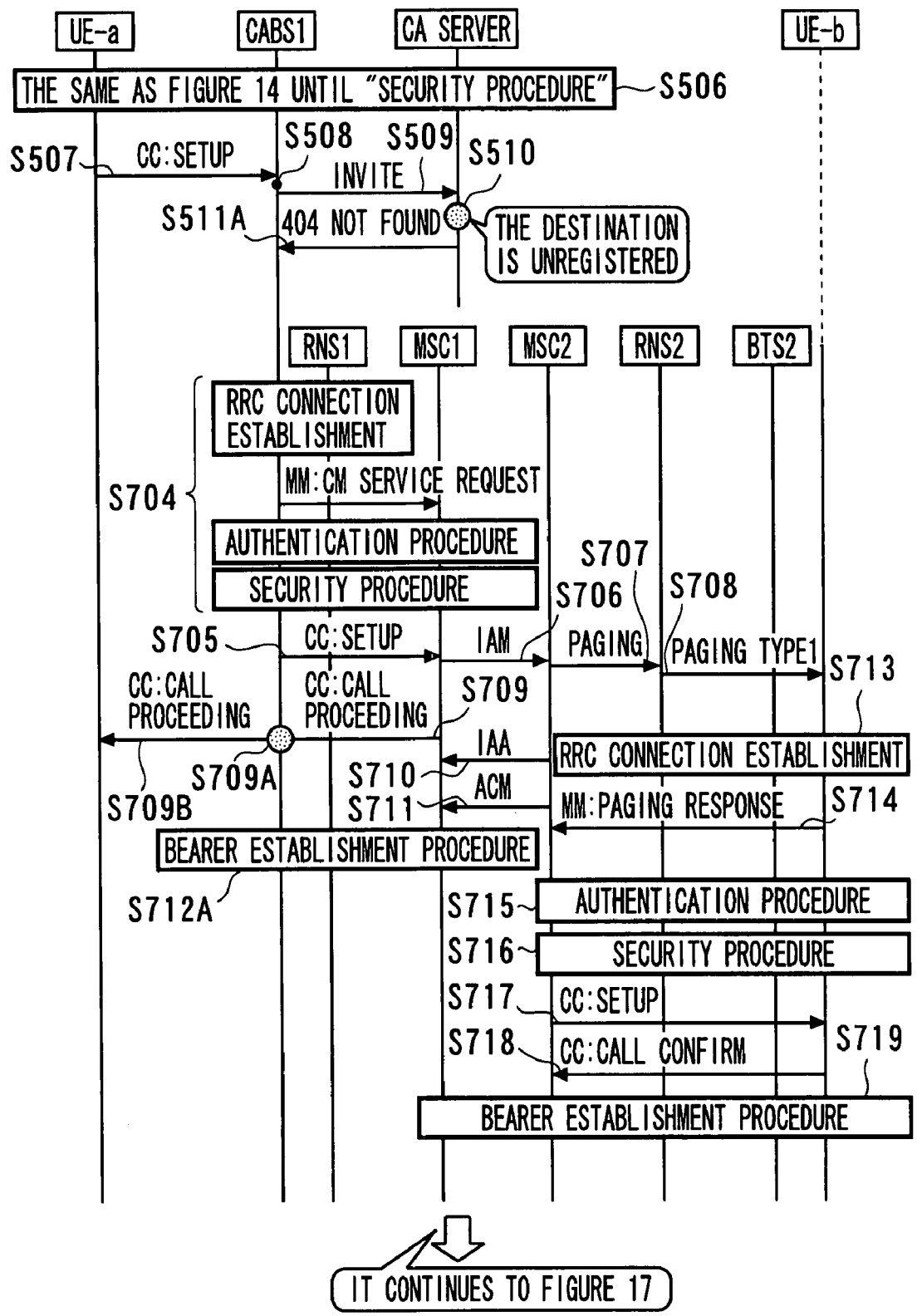
FIG. 20 is a sequence diagram in the case where a called-side CABS is unregistered in a CA server in the first mode of the present invention.

FIG. 20 is a sequence diagram in the case where counterpart information is not registered in the CA server in the case where the CA server is used, in the same way as in the first embodiment.

As shown in FIG. 20, the processes from the preprocess (S506) to the transmission of an INVITE message (S509) are the same as those in the first and second embodiments (FIGS. 14 and 16).

The CA server checks the counterpart information based on the INVITE message in the same way as in the second embodiment (S510). Herein, it is assumed that the information of the CABS2 corresponding to the terminal UE-b that is a destination terminal is not registered as the counterpart information.

In this case, the CA server cannot read the corresponding counterpart information from the registration table. Therefore, the CA server sends a 404 Not Found message indicating the absence of a counterpart to the CABS1 (S511A).

Then, the CABS1 behaves as a calling terminal, and starts a call connection sequence (signaling) through the mobile telephone network. This sequence is almost the same as the procedure in S704-S719 shown in FIG. 16.

In the sequence shown in FIG. 20, the terminal UE-a that is a calling terminal does not have an opportunity of returning a CALL PROCEEDING message (since the CABS1 does not receive the 100 Trying message). Therefore, taking the opportunity of having received the CALL PROCEEDING message (S709) sent to the CABS1 from the MSC1, the CABS1 generates a CALL PROCEEDING message with respect to the SETUP (S507) from the terminal UE-a (S709A), and sends it to the terminal UE-a (S709B). After that, a radio bearer establishment procedure is performed between the terminal UE-a and the MSC1 (S712A). In these points, the fifth embodiment is different from the second embodiment.

Figure 21:
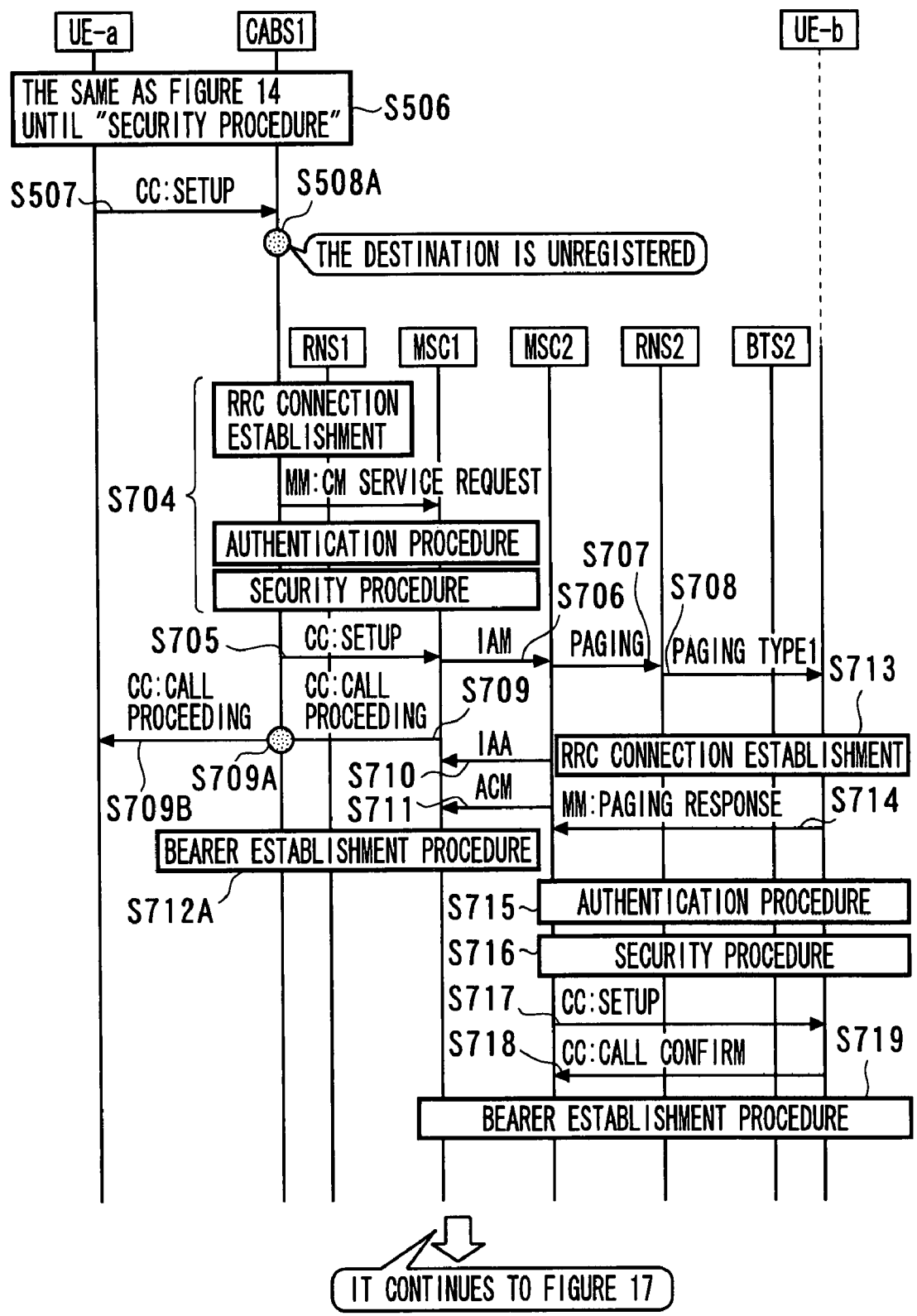
FIG. 21 is a sequence diagram in the case where a called-side CABS is unregistered in a calling-side CABS in the second mode of the present invention.

FIG. 21 is a sequence diagram showing an operation in the case where counterpart information is not registered in the CABS on the calling side when the CA server is not used, in the same way as in the third embodiment.

In FIG. 21, the preprocess (S506) and the SETUP transmission (S507) are the same as those in the third and fourth embodiments. The CABS1 checks whether or not the corresponding counterpart information has been registered based on the SETUP (S508A). At this time, the information on the CABS2 corresponding to the terminal UE-b that is a destination terminal has not been registered as the counterpart information. In this case, the CABS1 behaves as a calling terminal, and starts a call connection sequence (signaling) through the mobile telephone network. The processes after S508A are the same as those shown in FIG. 20, so that the description thereof will be omitted.

Sixth Embodiment

Figure 22:
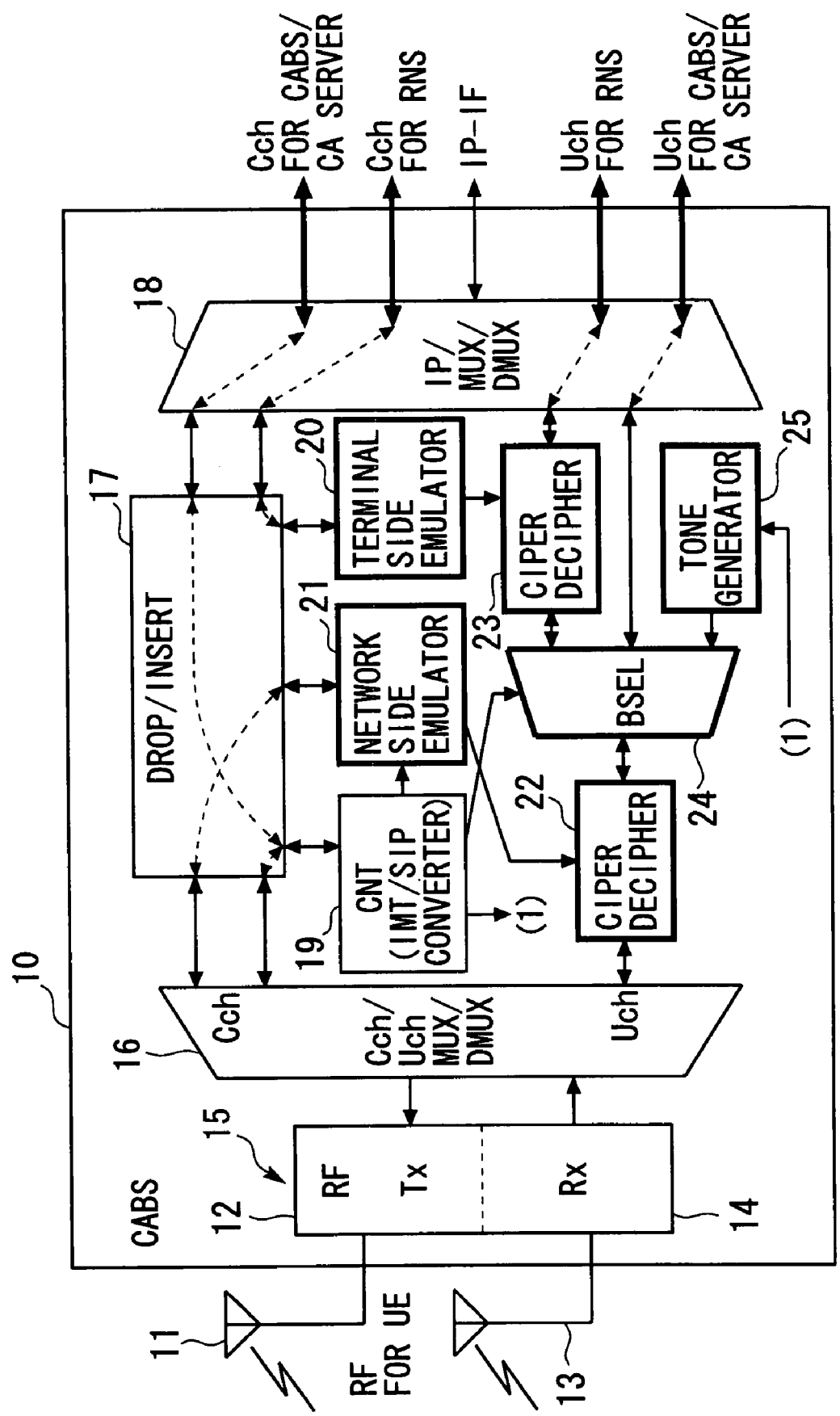
FIG. 22 is a block diagram showing an exemplary configuration of a very small base transceiver station (CABS) according to the present invention.

As a sixth embodiment, an embodiment of the CABS will be described. FIG. 22 is a functional block diagram of the CABS. The CABS having the configuration shown in FIG. 22 is applicable to the above-mentioned first to fifth embodiments.

In FIG. 22, the CABS includes a radio processing unit (RF) 15 composed of a transmitting unit (Tx) 12 connected to a transmitting antenna 11 and a receiving unit (Rx) 14 connected to the receiving antenna 13, a multiplexing/demultiplexing unit (Cch/Uch-Mux/Dmux) 16 with respect to a control channel (Cch) and a user channel (Uch), a capturing/inserting unit (Drop/Insert) 17, an IP multiplexing/demultiplexing unit (IP Mux/Dmux) 18, a control unit (controller: CNT (IMT/SIP Converter)) 19 (corresponding to a control unit), a terminal-side emulator (Terminal Side Emulator) 20, a network-side emulator (Network Side Emulator) 21 (corresponding to a replacing unit), a terminal-side cipher processing unit (Cipher Decipher) 22 (corresponding to a first cipher processing unit), a network-side cipher processing unit 23 (corresponding to second cipher processing unit), a bearer selector (Bsel) 24, and a tone generating unit (Tone Generator) 25.

A radio signal from the terminal (UE) is received by the RF 15, and divided into a control channel and a user channel by the multiplexing/demultiplexing unit 16. The capturing/inserting unit 17 determine which of the CNT unit 19, the terminal-side emulator 20, and the network-side emulator 21 these signals should be dropped to, depending upon the communication partner on the IP network side.

That is, in the case where the communication with a different CABS is performed via the IP network, a signal is sent to the CNT unit 19. At this time, a function (IMT/SIP converter; protocol converting unit) of converting a protocol for a mobile telephone (e.g., IMT-2000) into a protocol for an IP telephone (e.g., SIP) is operated, and the communication with the CABS on a called side or the CA server is performed. The protocol for an IP telephone is terminated with the CNT unit 19.

In the case where the communication with a different CABS cannot be performed, and the communication with the mobile telephone network is performed, it is necessary that a terminal recognizes the CABS as a network side, and the network side recognizes the CABS as a terminal.

Therefore, network-side emulator 21 and the terminal-side emulator 20 are mounted on the CABS 10 so that they can emulate a function as a terminal and a function as a mobile telephone network. That is, the network-side emulator unit 21 has a function of exchange for the preprocess with respect a terminal in placed of the RNS/MSC, and a function of generating a message based on a protocol for a mobile telephone to be sent to a terminal in place of the RNS/MSC.

On the other hand, the terminal-side emulator 20 has a function for the CABS1 to behave as a calling terminal. The terminal-side emulator 20 allows the CABS1 to perform a preprocess with respect to the RNS/MSC as a calling terminal, and a process of exchanging a message for a call connection.

A control signal converted in the above-mentioned blocks is inserted in the capturing/inserting unit 17, and thereafter, subjected to IP multiplexing (including IP packeting) in the IP multiplexing/demultiplexing 18 to be sent to a required partner (any of the CABS, the call connection server, and the RNS). A signal from the network side is sent to the radio processing unit 15 in a reverse route, and sent to a terminal.

A specific example will be described. For example, in the sequence shown in FIG. 14, the "SETUP" (S507) from the terminal UE-a is input to the capturing/inserting unit 17 via the receiving antenna 13, the receiving unit 14, and the multiplexing/demultiplexing unit 16, and captured in the CNT unit 19. Then, the CNT unit 19 converts "SETUP" into "INVITE", and passes it to the capturing/inserting unit 17. The "INVITE" is sent from the IP multiplexing/demultiplexing unit 18 to the call control server. The same operation is performed with respect to the "CONNECT ACT" (S539) from the terminal UE-a.

Further, the "100 Trying" (S511) from the CA server is input to the capturing/inserting unit 17 via the IP multiplexing/demultiplexing unit 18. The capturing/inserting unit 17 passes the "100 Trying" to the CNT unit 19. The CNT unit 19 converts the "100 Trying" into "CALL PROCEEDING" recognizable at the terminal UE-a, and passes it to the capturing/inserting unit 17. The "CALL PROCEEDING" is sent to the terminal UE-a through the multiplexing/demultiplexing unit 16, the transmitting unit 12, and the transmitting antenna 11. The same operation is performed with respect to the "180 Ringing" (S528) and the "200 OK" (S525) from the CA server.

Further, in the sequence shown in FIG. 16, the "408 Request Timeout" (S703) from the CA server is input to the capturing/inserting unit 17 via the IP multiplexing/demultiplexing unit 18. The "408 Request Timeout" is passed to the CNT unit 19. The CNT unit 19 subjects the "408 Request Timeout" to protocol conversion, and thereafter, passes it to the network-side emulator 21.

Then, the network-side emulator 21 passes the information related to the preprocess (S506) performed between the terminal UE-a and the CABS1 to the terminal-side emulator 20. The terminal-side emulator 20 performs the exchange of messages related to the preprocess (S704) with respect to the RNS1/MSC1, the transmission of "SETUP" (S705), and the establishment procedure of a radio bearer (S712), based on the information from the network-side emulator 21.

Further, in the sequence shown in FIG. 17, the "ALERTING" (S722) from the MSC1 is dropped from the capturing/inserting unit 17 to the terminal-side emulator 20. The terminal-side emulator 20 deciphers the "ALERTING" with an cipher key determined through the preprocess (S704), and passes it to the network-side emulator 21. The network-side emulator ciphers the "ALERTING" with the cipher key determined through the preprocess (S506), and passes it to the capturing/inserting unit 17 (ciphering/re-ciphering processing in S723).

The "ALERTING" is sent to the terminal UE-a through the capturing/inserting unit 17, the multiplexing/demultiplexing unit 16, the transmitting unit 12, and the transmitting antenna. The same operation as that of the "ALERTING" is also performed with respect to the "CONNECT" (S727) and the "RELEASE" (S738) from the MSC1.

On the other hand, in the sequence shown in FIG. 17, the "CONNECT ACK" (S731) from the terminal UE-a is dropped from the capturing/inserting unit 17 to the network-side emulator 21. Then, the network-side emulator 21 deciphers the "CONNECT ACK" with an cipher key determined through the preprocess (S506), and passes it to the terminal-side emulator 20. The terminal-side emulator 20 ciphers the "CONNECT ACK" with an cipher key determined through the preprocess (S704), and passes it to the capturing/inserting unit 17 (deciphering/re-ciphering processing in S732). The "CONNECT ACK" is sent to the MSC1 through the IP multiplexing/demultiplexing unit 19 (S733). The same operation as that of the "CONNECT ACK" is also performed with respect to the "DISCONNECT" (S727) and the "RELEASE COMPLETE" (S743) from the terminal UE-a.

The above-mentioned operation in the CABS 10 is substantially the same as that of FIGS. 18-21. However, the destination of a message from the CABS1 is varied between the CA server and a different CABS depending upon whether or not the CA server is used.

In FIG. 22, the user channel is also divided into two routes, depending upon whether the communication partner on the network side is the CA server, different CABS, or RNS/MSC. That is, the user channel is divided into a user channel on the RNS side and a user channel on the CABS/CA server side.

In the case where the communication partner is a CABS, a cipher from a terminal only needs to be deciphered, and user data is transferred in the CABS 10 through a route (first route) passing through only the cipher processing unit 22.

That is, when the receiving unit 14 receives the user data, the user data is input to the cipher processing unit 22 through the multiplexing/demultiplexing unit 16. The cipher processing unit 22 deciphers the user data using the cipher key obtained from the network-side emulator 21, and outputs it to the bearer selector 24. At this time, the bearer selector passes the user data directly from the cipher processing unit 22 to the IP multiplexing/demultiplexing unit 18 under the control of the CNT unit 19. Then, the user data is sent out to the user channel from the IP multiplexing/demultiplexing unit 18 to the CABS.

In contrast, in the case where a communication partner is an RNS, it is necessary to decipher the cipher applied to the user data from the terminal, and cipher the resultant user data with a cipher on the RNS side. Therefore, the user data passes through the second route passing through the cipher processing units 22 and 23 in the CABS. The number of times by which the user data passes through the cipher processing unit is determined by the CNT unit 19, and the bearer selector 24 is controlled based on the determination results.

More specifically, when the receiving unit 14 receives the user data, the user data is input to the cipher processing unit 22 through the multiplexing/demultiplexing unit 16. The cipher processing unit 22 deciphers the user data using the cipher key obtained from the network-side emulator 21, and outputs it to the bearer selector 24. At this time, the bearer selector passes the user data from the cipher processing unit 22 to the cipher processing unit 23 under the control of the CNT unit 19. The cipher processing unit 23 ciphers the user data with the cipher key from the terminal-side emulator 20, and thereafter, passes it to the IP multiplexing/demultiplexing unit 18. Then, the data is sent out to the user channel from the IP multiplexing/demultiplexing unit 18 to the RNS.

The same processing (deciphering/ciphering of user data and the control of the bearer selector 24) is also performed with respect to the user data (data in a reverse route) received from the CABS and the RNS. Thus, the bearer selector 24 functions as a switching unit, and the CNT unit 19 functions as a switching control unit.

Further, during the IP network communication or call switching, it is necessary to notify the user of a calling terminal of the IP network communication or call switching. A tone generating unit 25 for notifying the user of them with a tone (or a message) is provided in the CABS 10, and switching can be performed with an instruction from the CNT 19.

For example, in the sequence shown in FIG. 14, when transmitting the "ALERTING" to the terminal UE-a (S530), the CNT unit 19 passes an output instruction of the RBT to the tone generating unit 25. The tone generating unit 25 generates an RBT, and outputs it to the bearer selector 24. Further, the CNT unit 19 passes a control signal for selecting an RBT to the bearer selector 24. Consequently, the RBT is input to the cipher processing unit 22 through the bearer selector 24, and ciphered. Then, the RBT is sent to the terminal UE-a through the transmitting unit 12 (S531).

Further, in the sequence shown in FIG. 14, when transmitting the "CONNECT" to the terminal UE-a, the CNT unit 19 passes an instruction of stopping the generation of the RBT to the tone generating unit 25, and passes a control signal for selecting user data from the IP multiplexing/demultiplexing unit to the bearer selector 24. Consequently, the user data from the counterpart terminal (terminal UE-b) can be transferred to the terminal UE-a.

Thus, the tone generating unit 25 functions as a call sound generating unit, and the CNT unit 19 functions as a call sound control unit.

Further, for example, in the sequence shown in FIG. 16, in the case where the CABS1 receives "408 Request Timeout", a call destination is switched to the mobile telephone network (RNS). In this case, the wait time of the user of the calling terminal becomes long. In view of this, the following may be performed. The tone generating unit 25 generates a special tone indicating that the call destination has been switched, the special tone is connected to the user channel that has already been established between the tone generating unit 25 and the calling terminal, and the user is notified that the call destination has been switched. The connection processing of the special tone can be performed under the control of the bearer selector 24 by the CNT unit 19.

Thus, the tone generating unit 25 functions as a notification sound generating unit, and the CNT unit 19 functions as a notification sound control unit.

The CABS according to the present invention is a device in which the functions represented by the bold frames and bold characters of FIG. 22 are further mounted on the basic configuration of the CABS, and the object of the present invention can be achieved using the CABS provided with those functions. Each function may be composed of a dedicated hardware chip, or may be realized when a predetermined program is executed by a processor (CPU etc.).

Seventh Embodiment

Finally, an embodiment of the function of identifying a destination by the CA server and the CABS according to an embodiment will be described.

FIG. 23 is a block diagram showing an exemplary configuration of a call control device (CA Sever) applicable to the first, second, and fifth embodiments. In FIG. 23, the call control device 30 includes a message receiving unit 31 (corresponding to the receiving unit) for receiving a message from the CABS, a message analyzing unit 32 for analyzing the message received by the message receiving unit 31, a counterpart searching unit 33 (corresponding to a searching unit, a judging unit, and a determining unit) for searching for a transfer destination of a message or a transmission destination of a response message in accordance with the analysis results of the message analyzing unit 32, a message generating unit 34 for editing a message or creating a response message in accordance with the analysis results, a message transmitting unit 35 (corresponding to the transmitting unit) for transmitting a message from the message generating unit 34, and a registration table storing unit 36 (corresponding to the storing unit) for storing a registration table 36A referred to/searched for by the counterpart searching unit 33.

The message receiving unit 31 is connected to the control channel from the CABS, and receives a message (e.g., an SIP message) sent through the control channel.

The message analyzing unit 32 analyzes the contents of the message received by the message receiving unit 31, and passes the message and the analysis results to the message generating unit 34.

The counterpart searching unit 33 receives a parameter for referring to the registration table 36A from the message analyzing unit 32, searches for a corresponding entry from the registration table 36A using the parameter, and passes a parameter contained in the searched entry to the message generating unit 34.

The message generating unit 34 edits a message or creates a response message based on the analysis results of the message and the search results of the counterpart searching unit 33, and passes it to the message transmitting unit 35.

The message transmitting unit 35 sends out the message received from the message generating unit 34 to the control channel directed to the CABS.

In the registration table 36A, an entry of counterpart information related to the CABS connected to the ISP network in which the call control device 10 is provided. In each entry, an IP address of the CABS, a terminal telephone number as identification information on a mobile telephone terminal capable of using the CABS, and other pieces of required information (information registered in an existing registration table, etc.) are registered.

The example shown in FIG. 23 shows an IP address of the CABS1, an entry of counterpart information containing a telephone number of the terminal UE-a as identification information of a mobile telephone terminal capable of using the CABS1, an IP address of the CABS2, and an entry of a counterpart containing a telephone number of the terminal UE-b as identification information of a mobile telephone terminal capable of using the CABS2.

A specific exemplary operation of the call control device 30 will be described. For example, in the sequence of FIG. 14, the "INVITE" (calling request from the terminal UE-a: S509) sent from the CABS1 is received by the message receiving unit 31. Then, the following processing is performed as the processing in S510.

That is, the message analyzing unit 32 extracts a transmission origin IP address of the "INVITE", and a telephone number of a calling terminal included in the "INVITE" and a telephone number of a destination terminal as search parameters, and passes them to the counterpart searching unit 33.

The counterpart searching unit 33 initially searches the registration table for an entry including the transmission origin IP address and the telephone number of the calling terminal. At this time, as the corresponding entry, an entry (entry containing the IP address of the CABS1 and the telephone number of the terminal UE-a) of Entry No. 1 is searched for from the registration table 36. Because of this, the counterpart searching unit 33 determines that the CABS+terminal on a calling side have been registered.

Next, the counterpart searching unit 33 searches the registration table 36 for the corresponding entry, using the telephone number of the destination terminal (terminal UE-b) as a key. At this time, an entry of Entry No. 2 containing the IP address of the CABS2 corresponding to the telephone number of the terminal UE-b is searched for.

Then, the counterpart searching unit 33 determines that both the calling side and the receiving side have been registered, determines that the direct connection between CABSs can be performed, and determines the searched IP address of the CABS2 as the destination address of the "INVITE". The determination results containing the IP address (IP address of the CABS2) at the destination are passed to the message generating unit 34 from the counterpart searching unit 33.

The message generating unit 34 receives the "INVITE" from the message analyzing unit 32, and receives the determination results containing the IP address of the CABS2 from the counterpart searching unit 33. Then, the message generating unit 34 sets the IP address of the call control device 30 in the transmission origin IP address of the "INVITE", sets the IP address of the CABS2 in the destination address, and passes them to the message transmitting unit 35. The message transmitting unit 35 sends the "INVITE" toward the CABS2 (FIG. 14; S512).

In contrast, in the case where the entry (herein, the entry of Entry No. 2) corresponding to the telephone number of the destination terminal included in the "INVITE" is not registered in the registration table 36, the counterpart searching unit 33 cannot search for the corresponding entry. In this case, the counterpart searching unit 33 determines that the receiving side is unregistered (that is, the direct connection between the CABSs cannot be performed (see FIG. 20; S510).

In this case, the counterpart searching unit 33 passes the determination results that the receiving side is unregistered to the message generating unit 34. Then, the message generating unit 34 generates a "404 Not Found" message in response to the "INVITE" from the message analyzing unit 32, and passes it to the message transmitting unit 35. At this time, the destination IP address of the message is set in the CABS1 based on the transmission origin IP address of the "INVITE". The message transmitting unit 35 sends the "404 Not Found" message to the CABS1 (FIG. 20; S511A).

FIG. 24 is a diagram showing an exemplary configuration of the function of identifying a counterpart of a calling request provided in the CABS. The configuration (identifying unit 40 of a counterpart) of FIG. 24 can be mounted on the CNT unit 19 (corresponding to a control unit) shown in FIG. 22.

In FIG. 24, the identifying unit 40 of a counterpart can include a message receiving unit 41 (corresponding to the receiving unit), a message analyzing unit 42, a counter part searching unit 43 (corresponding to a searching unit, a judging unit, and a determining unit), a message generating unit 44, a message transmitting unit 45 (corresponding to the transmitting unit), and a registration table storing unit 46 (corresponding to the storing unit) for storing a registration table 46A. A general function of each unit is the same as that of each unit shown in FIG. 23.

A specific exemplary operation of the identifying unit 40 is as follows. For example, as shown in FIG. 18, when the "SETUP" from the terminal UE-a is input to the CNT unit 19 (FIG. 22), the "SETUP" is input to the message analyzing unit 42 through the message receiving unit 41.

The message analyzing unit 42 extracts identification information (telephone number of the terminal UE-b) on the destination terminal from the "SETUP", and passes it to the counterpart searching unit 43. The counterpart searching unit 43 searches the registration table 46 for a corresponding entry. Herein, as the corresponding entry, an entry of Entry No. 1 including the IP address of the CABS2 is searched for (herein, in FIG. 24, it is assumed that only the entry of Entry No. 1 is registered). Because of this, the counterpart searching unit 43 determines the destination of the "SETUP" to be the CABS2, and passes the determination results to the message generating unit 34.

When receiving the "SETUP" from the message analyzing unit 42, the message generating unit 44 converts the "SETUP" into "INVITE" using the IMT/SIP converter (FIG. 22), sets the IP address of the CABS2 in the destination IP address of the "INVITE", and passes the "INVITE" to the message transmitting unit 45. The message transmitting unit 45 passes the "INVITE" to the capturing/inserting unit 17 (FIG. 22). Consequently, the "INVITE" is sent from the CABS1 to the CABS2 (FIG. 18; S509A).

In the case where the counterpart searching unit 43 cannot search for the counterpart information corresponding to the destination terminal (herein, in the case where the entry of Entry No. 1 is not registered), the counterpart searching unit 43 determines that the counterpart of the calling request is unregistered (the direct connection between the CABSs is impossible), determines the destination of the calling request to be the mobile telephone network (FIG. 21; S508A), and passes the determination results to the message generating unit 44.

Then, the message generating unit 44 generates a calling start instruction (internal message in the CABS) for instructing the network-side emulator 21 (FIG. 22) to start a calling by the terminal-side emulator 20, and passes it to the message transmitting unit 45. The message transmitting unit 45 passes the calling start instruction to the network-side emulator 21. Because of this, the information related to the preprocess is passed from the network-side emulator 21 to the terminal-side emulator 20, and the terminal-side emulator starts the process after S704 of FIG. 21.

The entry of Entry No. 2 in the registration table 46 shown in FIG. 24 is an entry assuming the case where the terminal UE-b can be connected to the mobile telephone network using either the CABS2 or the CABS3 (not shown) (the case where the relationship between the terminal and the CABS is 1:N (N is a natural number)).

In this case, the "INVITE" directed to each of the CABS2 and the CABS3 is sent from the CABS1. Further, such an entry may be registered in the registration table 36 of the call control device 30 so that the "INVITE" from the call control device 30 can be sent to the CABS2 and the CABS3.

In the embodiment shown in FIGS. 22 and 24, an embodiment has been illustrate in which the CABS has an IMT/SIP converter, thereby performing protocol conversion. However, in the case where a message is directly exchanged between the CABSs, it is not necessary to perform protocol conversion. Therefore, the IMT/SIP converter can be omitted.

Functional Effect of Embodiments

According to the embodiments of the present invention as described above, in the case where data communication is performed using two CABSs connected to the same ISP (IP) network between terminals, a data transmission line is established in which two CABSs are directly connected without a mobile telephone network, and user data is communicated between the terminals using the data transmission line. This can reduce the traffic amount of the mobile telephone network and the ISP network.

Further, in the CABS on the calling side, a calling request is initially sent to the CA server or the CABS on the receiving side, instead of the mobile telephone network side (RNS). Because of this, traffic for control does not occur in the mobile telephone network, so that the load on the mobile telephone network can be reduced.

Further, in the case where the CABSs are connected directly using the CA server for an IP telephone provided in an ISP network, a protocol converting unit is provided in each CABS, and the CA server can handle each CABS as an IP telephone. Because of this, the alteration with respect to the CA server can be minimized, which can reduce the cost required for carrying out the present invention.

Further, in the case where the CA server is not used, it is not necessary to alter constituent elements of the ISP network. Further, in carrying out the present invention, it is not necessary to alter the mobile telephone network and the mobile telephone terminal. Thus, the cost for carrying out the present invention can be suppressed.

Further, irrespective of whether or not the CA server is used, in the case where there is no destination terminal under the command of the CABS on a receiving side, or in the case where the counter part information on the receiving side is not registered, the CABS on a calling side functions as a terminal to perform connection processing with a destination terminal, and a bearer established by the connection processing is connected to a bearer established between the calling-side CABS and the calling terminal. Thus, the connection between the calling terminal and the destination terminal can be compensated for, without wasting the calling operation (including a preprocess) performed by the calling terminal. Even in this case, it is not necessary to alter the mobile telephone network and the mobile telephone terminal, so that the cost for introducing the present invention can be suppressed.

Others

The Disclosures of International Application PCT/JP2004/015496 filed on Oct. 20, 2004 including the specification, drawings and abstract are incorporated herein by reference.

What is claimed is:

1. A system for establishing a data transmission line between mobile telephone terminals, comprising:
   a plurality of radio base transceiver stations accommodated in a mobile telephone network through an identical IP (Internet Protocol) network; and
   a call agent device provided to the IP network, wherein:
   the call agent device comprises:
      a storage portion that stores counterpart information including identification information of a mobile telephone terminal on a called side and an IP address of a radio base transceiver station accommodated in the IP network, the radio base transceiver station being available to the mobile telephone terminal on the called side;
      a receiving portion that receives a calling request issued and transmitted by a mobile telephone terminal as a calling terminal, from one of the plurality of radio base transceiver stations as radio base transceiver stations on a calling side;
      a retrieving portion that obtains identification information of a mobile telephone terminal as a called terminal, and reads out, from the storage portion, an IP address of a radio base transceiver station corresponding to the identification information obtained, the identification information being included in the calling request; and
      a transmitting portion that transmits the calling request, in a case where an IP address of a radio base transceiver station is read out by the retrieving portion, to the IP address by assuming that a radio base transceiver station having the IP address is a radio base transceiver station on a called side; and
   the system establishes a data communication line between the radio base transceiver station on the calling side and the radio base transceiver station on the called side through the call agent device, in a case where the called terminal is subordinated to the radio base transceiver station on the called side itself, the data communication line being established for transmitting data to be exchanged between the calling terminal and the called terminal, the data communication line connecting the radio base transceiver station on the calling side and the radio base transceiver station on the called side to each other through the IP network without routing through the mobile telephone network.

2. A system for establishing a data transmission line between mobile telephone terminals according to claim 1, wherein:
   the radio base transceiver station on the calling side and the radio base transceiver station on the called side each comprise a protocol converting portion for performing conversion process for converting between a mobile telephone protocol which is used between a mobile telephone terminal and each of the radio base transceiver station on the calling side and the radio base station on the called side and an IP telephone protocol which is used between the call agent device and each of the radio base transceiver station on the calling side and the radio base station on the called side;
   the radio base transceiver station on the calling side uses the protocol converting portion of the radio base transceiver station on the calling side itself to convert a form of a calling request and a message to be transmitted to the call agent device, which are received from the calling terminal and have a protocol based on the mobile telephone protocol, into a form based on the IP telephone protocol, and transmits the calling request and the message to the call agent device; and
   the radio base transceiver station on the called side uses the protocol converting portion of the radio base transceiver station on the called side itself to convert a form of the calling request and the message to be transmitted to the called terminal, which are received from the call agent device and have a protocol based on the IP telephone protocol, into a form based on the mobile telephone protocol, and transmits the calling request and the message to the called terminal.

3. A system for establishing a data transmission line between mobile telephone terminals according to claim 1, wherein:

the radio base transceiver station on the called side notifies, through the call agent device, the radio base transceiver station on the calling side of a message indicating that the called terminal does not exist under the radio base transceiver station on the called side, in a case where the radio base transceiver station on the called side cannot receive a response with respect to the calling request which has been transmitted to the called terminal; and the radio base transceiver station on the calling side establishes a first data transmission line between the radio base transceiver station on the calling side and the calling terminal, establishes a second data transmission line through the mobile telephone network in a case where the message has been received from the call agent device, the second data transmission line connecting the radio base transceiver station on the calling side and the called terminal by assuming that the radio base transceiver station on the calling side itself as a calling terminal, and establishes a data transmission line between the calling terminal and the called terminal by connecting the first data transmission line and the second data transmission line.

4. A system for establishing a data transmission line between mobile telephone terminals according to claim 1, wherein:

the call agent device notifies the radio base transceiver station on the calling side of a message indicating that the radio base transceiver station on the called side to be connected does not exist, in a case where counterpart information corresponding to the calling request is not registered in the storage portion; and the radio base transceiver station on the calling side establishes a first data transmission line between the radio base transceiver station on the calling side and the calling terminal, establishes a second data transmission line through the mobile telephone network, the second data transmission line connecting the radio base transceiver station on the calling side and the called terminal by assuming that the radio base transceiver station on the calling side itself as a calling terminal, and establishes a data transmission line between the calling terminal and the called terminal by connecting the first data transmission line and the second data transmission line.

5. A system for establishing a data transmission line between mobile telephone terminals according to claim 3, wherein:

the radio base transceiver station on the calling side comprises a first cipher/decipher processing portion for ciphering/deciphering a control signal and user data based on a first cipher agreed on between the radio base transceiver station on the calling side and the calling terminal, and a second cipher/decipher processing portion for ciphering/deciphering a control signal and user data based on a second cipher agreed on between the radio base transceiver station on the calling side and the mobile telephone network;

the radio base transceiver station on the calling side, when receiving the control signal and user data ciphered based on the first cipher from the calling terminal, deciphers the control signal and the user data by the first cipher/decipher processing portion, and transmits the control signal and the user data to the mobile telephone network after ciphering the deciphered control signal and the deciphered user data by the second cipher/decipher processing portion; and the radio base transceiver station on the calling side, when receiving the control signal and the user data ciphered based on the second cipher from the mobile telephone network, deciphers the control signal and the user data by the second cipher/decipher processing portion, and transmits the control signal and the user data to the calling terminal after ciphering the deciphered control signal and the deciphered user data by the first cipher/decipher processing portion.

6. A system for establishing a data transmission line between mobile telephone terminals according to claim 1, wherein:

the transmitting portion transmits, in a case where a plurality of IP addresses of radio base transceiver stations each correspond to identification information of the called terminal are retrieved, the calling request to each of the plurality of IP addresses thus retrieved; and one of the radio base transceiver stations corresponding to the plurality of IP addresses, which subordinates the called terminal, establishes, as the radio base transceiver station on the called side, a data communication line with respect to the radio base transceiver station on the calling side, the data communication line connecting the radio base transceiver station on the calling side and the radio base transceiver station on the called side to each other through the IP network without routing through the mobile telephone network.

7. A system for establishing a data transmission line between the mobile telephone terminals, comprising a plurality of radio base transceiver stations accommodated in a mobile telephone network through an identical IP (Internet Protocol) network, wherein at least one of the plurality of radio base transceiver stations as radio base transceiver stations on the calling side comprises:

a storage portion that stores counterpart information including identification information of a mobile telephone terminal on a called side and an IP address of a radio base transceiver station accommodated in the IP network which is available to the mobile telephone terminal on called side;

a receiving portion that receives a calling request issued by a mobile telephone terminal as a calling terminal;

a retrieving portion that obtains identification information of a mobile telephone terminal as a called terminal, and retrieves, from the storage portion, an IP address of a radio base transceiver station corresponding to the identification information obtained, the identification information being included in the calling request;

a transmitting portion that transmits the calling request, in a case where an IP address of a radio base transceiver station corresponding to the identification information is retrieved, to the IP address by assuming that a radio base transceiver station having the IP address is a radio base transceiver station on a called side; and a control portion to establish a data transmission line by connecting the radio base transceiver station on the calling side and the radio base transceiver station on the called side to each other through the IP network without routing through the mobile telephone network with respect to the radio base transceiver station on the called side, when the called terminal exists under the radio station on the called side itself, the data transmission line being established for transmitting data to be exchanged between the calling terminal and the called terminal.

8. A system for establishing a data transmission line according to claim 7, wherein:

the radio base transceiver station on the called side notifies, in a case where the radio base transceiver station on the called side cannot receive a response with respect to the calling request which has been transmitted to the called terminal, the radio base transceiver station on the calling side of a message indicating that the called terminal does not exist under the radio base transceiver station on the called side; and the radio base transceiver station on the calling side establishes a first data transmission line between the radio base transceiver station on the calling side and the calling terminal, establishes in a case where the message has been received from the radio base transceiver station on the called side a second data transmission line in which the radio base transceiver station on the calling side and the called terminal are connected to each other through the mobile telephone network by assuming that the radio base transceiver station of the calling side itself as a calling terminal, and establishes a data transmission line between the calling terminal and the called terminal by connecting the first data transmission line and the second data transmission line.

9. A system for establishing a data transmission line according to claim 7, wherein the radio base transceiver station on the calling side establishes a first data transmission line between the radio base transceiver station on the calling side and the calling terminal in a case where counterpart information corresponding to the calling request is not registered in the storage portion, further establishes a second data transmission line in which the radio base transceiver station on the calling side and the called terminal are connected to each other through the mobile telephone network by assuming that the radio base transceiver station on the calling side itself as a calling terminal, and establishes a data transmission line between the calling terminal and the called terminal by connecting the first data transmission line and the second data transmission line.

10. A system for establishing a data transmission line between mobile telephone terminals according to claim 8, wherein:

the radio base transceiver station on the calling side comprises a first cipher/decipher processing portion for ciphering/deciphering a control signal and user data based on a first cipher agreed on between the radio base transceiver station on the calling side and the calling terminal, and a second cipher/decipher processing portion for ciphering/deciphering a control signal and user data based on a second cipher agreed on between the radio base transceiver station on the calling side and the mobile telephone network;

the radio base transceiver station on the calling side, when receiving the control signal and user data ciphered based on the first cipher from the calling terminal, deciphers the control signal and the user data by the first cipher/decipher processing portion, and transmits the control signal and the user data to the mobile telephone network after ciphering the deciphered control signal and the deciphered user data by the second cipher/decipher processing portion; and the radio base transceiver station on the calling side, when receiving the control signal and the user data ciphered based on the second cipher from the mobile telephone network, deciphers the control signal and the user data by the second cipher/decipher processing portion, and transmits the control signal and the user data to the calling terminal after ciphering the deciphered control signal and the deciphered user data by the first cipher/decipher processing portion.

11. A system for establishing a data transmission line between mobile telephone terminals according to claim 7, wherein:

the transmitting portion transmits, in a case where a plurality of IP addresses of radio base transceiver stations each correspond to identification information of the called terminal are retrieved, the calling request to each of the plurality of IP addresses thus retrieved; and one of the radio base transceiver stations corresponding to the plurality of IP addresses, which subordinates the called terminal, establishes, as the radio base transceiver station on the called side, a data communication line with respect to the radio base transceiver station on the calling side, the data communication line connecting the radio base transceiver station on the calling side and the radio base transceiver station on the called side to each other through the IP network without routing through the mobile telephone network.

12. A radio base transceiver station of a mobile telephone terminal accommodated in a mobile telephone network through an IP (Internet Protocol) network, comprising:

a receiving portion that receives a calling request from a mobile telephone terminal as a calling terminal;

a transmitting portion that transmits the calling request to a call agent device in the IP network; and a control portion to establish a data transmission line, in a case where the calling request transmitted by the call agent device can be received by the mobile telephone terminal as a called terminal of the calling request by using another radio base transceiver station connected to the IP network, the data communication line being established for transmitting data to be exchanged between the calling terminal and the called terminal, the data communication line connecting the radio base transceiver station and the another radio base transceiver station to each other through the IP network without routing through the mobile telephone network the data communication line being established with respect to the another radio base transceiver station through the call agent device, a protocol converting portion that performs conversion process for converting between a mobile telephone protocol which is used between the radio base transceiver station and a mobile telephone terminal and an IP telephone protocol which is used between the radio base transceiver station and the call agent device, wherein the protocol converting portion converts a form of a message, which is received from a mobile telephone terminal subordinated to the radio base transceiver station itself and is to be transmitted to the call agent device, into a form based on the IP telephone protocol, and converts a form of a message, which is received from the call agent device based on the IP telephone protocol and is to be transmitted to a mobile telephone terminal subordinated to the radio base transceiver station itself, into a form based on the mobile telephone protocol.

13. A radio base transceiver station of a mobile telephone terminal according to claim 12, wherein the radio base transceiver station establishes, as a radio base transceiver station on a calling side, a first data transmission line with respect to the calling terminal, establishes a second data transmission line by assuming that the radio base transceiver station itself as a calling terminal, in a case where a message indicating that the called terminal does not exist under the radio base transceiver station on the calling side is received by the receiving portion through the call agent device, the second data transmission line connecting the radio base transceiver station on the calling side and the called terminal to each other through the mobile telephone network, and establishes a data transmission line between the calling terminal and the called terminal by connecting the first data transmission line and the second data transmission line.

14. A radio base transceiver station of a mobile telephone terminal according to claim 12, wherein the radio base transceiver station establishes, as a radio base transceiver station on the calling side, a first data transmission line, in a case where the call agent device cannot find the another radio base transceiver station to which the calling request is to be transmitted, the first data transmission line being established between the radio base transceiver station itself and the calling terminal, establishes a second data transmission line by assuming the radio base transceiver station itself as a calling terminal, the second transmission line connecting the radio base transceiver station itself and the called terminal through the mobile telephone network, and establishes a data transmission line between the calling terminal and the called terminal by connecting the first data transmission line and the second data transmission line.

15. A radio base transceiver station of a mobile telephone terminal according to claim 13, wherein the radio base transceiver station executes a call connection procedure between the called terminal and the radio base transceiver station through the mobile telephone network in order to establish the second data transmission line, by sending out signals to the mobile telephone network by assuming the radio base transceiver station itself as a calling terminal, based on information obtained through a call connection procedure performed between the radio base transceiver station and the calling terminal for establishing the first data transmission line.

16. A radio base transceiver station of a mobile telephone terminal according to claim 15, wherein the radio base transceiver station, in a case of sending out signals to the mobile telephone network by assuming that the radio base transceiver station itself as a calling terminal, sends back a response message corresponding to a message received from the calling terminal and the mobile telephone network, in a manner that the radio base transceiver station itself can be regarded as the mobile telephone network with respect to the calling terminal and also can be regarded as a calling terminal with respect to the mobile telephone network.

17. A radio base transceiver station of a mobile telephone terminal according to claim 13, further comprising:

a first cipher/decipher processing portion for ciphering/deciphering a control signal and user data based on a first cipher system agreed on between the radio base transceiver station itself and the calling terminal; and a second cipher/decipher processing portion for ciphering/deciphering a control signal and user data based on a second cipher system agreed on between the radio base transceiver station itself and the mobile telephone network, wherein:

the radio base transceiver station, when receiving the control signal and the user data ciphered based on the first cipher system from the calling terminal, deciphers the control signal and the user data by the first cipher/decipher processing portion, ciphers the deciphered control signal and the deciphered user data by the second cipher/decipher processing portion, and transmits the control signal and the user data to the mobile telephone network; and the radio base transceiver station, when receiving the control signal and the user data ciphered based on the second cipher system from the mobile telephone network, deciphers the control signal and the user data by the second cipher/decipher processing portion, ciphers the deciphered control signal and the deciphered user data by the first cipher/decipher processing portion, and transmits the control signal and the user data to the calling terminal.

18. A radio base transceiver station of a mobile telephone terminal accommodated in a mobile telephone network through an IP (Internet Protocol) network, comprising:

a storage portion for storing counterpart information including identification information of a mobile telephone terminal on a called side and an IP address of a radio base transceiver station accommodated in the IP network which is available to the mobile telephone terminal on a called side;

a receiving portion for receiving a calling request issued by a mobile telephone terminal as a calling terminal;

a retrieving portion for obtaining identification information of a mobile telephone terminal as a called terminal, and for retrieving, from the storage portion, an IP address of a radio base transceiver station corresponding to the identification information obtained, the identification information being included in the calling request;

a transmitting portion for transmitting the calling request, in a case where an IP address of a radio base transceiver station corresponding to the identification information is retrieved, to the IP address by assuming that a radio base transceiver station having the IP address is a radio base transceiver station on a called side; and a control unit to establish a data transmission line by connecting the radio base transceiver station itself and the radio base transceiver station on the called side to each other through the IP network without routing through the mobile telephone network with respect to the radio base transceiver station on the called side, when the called terminal exists under the radio station on the called side itself, the data transmission line being established for transmitting data to be exchanged between the calling terminal and the called terminal.

19. A radio base transceiver station of a mobile telephone terminal according to claim 18, further comprising a substitute unit to carry out, in place of the mobile telephone network, a procedure executed between a mobile telephone terminal and the mobile telephone network.

20. A radio base transceiver station of a mobile telephone terminal according to claim 18, wherein the radio base transceiver station establishes, as a radio base transceiver station on a calling side, a first data transmission line with respect to the calling terminal, establishes a second data transmission line by assuming that the radio base transceiver station itself as a calling terminal, in a case where a message indicating that the called terminal does not exist under the radio base transceiver station on the called side is received by the receiving portion from the radio base transceiver station on the called side, the second data transmission line connecting the radio base transceiver station on the calling side and the called terminal to each other through the mobile telephone network, and establishes a data transmission line between the calling terminal and the called terminal by connecting the first data transmission line and the second data transmission line.

21. A radio base transceiver station of a mobile telephone terminal according to claim 18, wherein the radio base transceiver station establishes a first data transmission line between the radio base transceiver station on the calling side and the calling terminal in a case where counterpart information corresponding to the calling request is not registered in the storage portion, establishes a second data transmission line in which the radio base transceiver station and the called terminal are connected to each other through the mobile telephone network by assuming that the radio base transceiver station on the calling side itself as a calling terminal, and establishes a data transmission line between the calling terminal and the called terminal by connecting the first data transmission line and the second data transmission line.

22. A radio base transceiver station of a mobile telephone terminal according to claim 20, wherein the radio base transceiver station executes a call connection procedure between the called terminal and the radio base transceiver station through the mobile telephone network in order to establish the second data transmission line, by sending out signals to the mobile telephone network by assuming the radio base transceiver station itself as a calling terminal, based on information obtained through a call connection procedure performed between the radio base transceiver station and the calling terminal for establishing the first data transmission line.

23. A radio base transceiver station of a mobile telephone terminal according to claim 22, wherein the radio base transceiver station, in a case of sending out signals to the mobile telephone network by assuming that the radio base transceiver station itself as a calling terminal, sends back a response message corresponding to a message received from the calling terminal and the mobile telephone network, in a manner that the radio base transceiver station itself can be regarded as the mobile telephone network with respect to the calling terminal and also can be regarded as a calling terminal with respect to the mobile telephone network.

24. A radio base transceiver station of a mobile telephone terminal according to claim 20, further comprising:

a first cipher/decipher processing portion for ciphering/deciphering a control signal and user data based on a first cipher agreed on between the radio base transceiver station itself and the calling terminal; and a second cipher/decipher processing portion for ciphering/deciphering a control signal and user data based on a second cipher agreed on between the radio base transceiver station itself and the mobile telephone network, wherein:

the radio base transceiver station, when receiving the control signal and the user data ciphered based on the first cipher system from the calling terminal, deciphers the control signal and the user data by the first cipher/decipher processing portion, ciphers the deciphered control signal and the deciphered user data by the second cipher/decipher processing portion, and transmits the control signal and the user data to the mobile telephone network; and the radio base transceiver station, when receiving the control signal and the user data ciphered based on the second cipher system from the mobile telephone network, deciphers the control signal and the user data by the second cipher/decipher processing portion, ciphers the deciphered control signal and the deciphered user data by the first cipher/decipher processing portion, and transmits the control signal and the user data to the calling terminal.

25. A radio base transceiver station of a mobile telephone terminal according to claim 17, further comprising:

a first route through which user data goes through only the first cipher/decipher processing portion and a second route through which user data goes through the first cipher/decipher processing portion and the second cipher/decipher processing portion, in the radio base transceiver station;

a switching portion that switches a transfer route of the user data in the radio base transceiver station between the first route and the second route; and a switching control portion that causes the switching portion to select the first route in a case where a data transmission route in which the radio base transceiver station and the another radio base transceiver station are connected through the IP network not by way of the mobile telephone network is established, and causes the switching portion to select the second route in a case where the first data transmission line and the second data transmission line are connected to each other.

26. A radio base transceiver station of a mobile telephone terminal according to claim 12, further comprising:

a ring tone generator that generates a ring tone in the called terminal; and a ring tone control portion that connects the ring tone generated by the ring tone generator to a data transmission line established between the calling terminal and the radio base transceiver station, in a case where a data transmission line is established by connecting the radio base transceiver station itself and the radio base transceiver station on the called side to each other through the IP network without routing through the mobile telephone network, the ring tone being connected from when a message indicating that the called terminal is being called is received until a message indicating that the called terminal has responded to the calling is received.

27. A radio base transceiver station according to claim 13, further comprising:

a notification tone generator; and a notification tone control portion that connects a notification tone generated by the notification tone generator to the first data transmission line established between the calling terminal and the radio base transceiver station, in a case of establishing the second data transmission line by assuming the radio base transceiver station itself as a calling terminal.

* * * * *